United States Patent
Nakamura et al.

(10) Patent No.: US 11,836,378 B2
(45) Date of Patent: Dec. 5, 2023

(54) STORAGE SYSTEM

(71) Applicant: Hitachi, Ltd., Tokyo (JP)

(72) Inventors: Takaki Nakamura, Tokyo (JP);
Takahiro Yamamoto, Tokyo (JP);
Shintaro Ito, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/692,764

(22) Filed: Mar. 11, 2022

(65) Prior Publication Data

US 2023/0077961 A1 Mar. 16, 2023

(30) Foreign Application Priority Data

Sep. 10, 2021 (JP) .................................. 2021-147792

(51) Int. Cl.
*G06F 3/06* (2006.01)

(52) U.S. Cl.
CPC .......... *G06F 3/0656* (2013.01); *G06F 3/0604* (2013.01); *G06F 3/0676* (2013.01); *G06F 3/0679* (2013.01)

(58) Field of Classification Search
CPC .... G06F 3/0656; G06F 3/0604; G06F 3/0676; G06F 3/0679; G06F 3/061; G06F 3/0649; G06F 3/0685
See application file for complete search history.

(56) References Cited

U.S. PATENT DOCUMENTS

| | | | |
|---|---|---|---|
| 2011/0072225 A1* | 3/2011 | Kawaguchi | G06F 3/0685 711/170 |
| 2012/0246386 A1 | 9/2012 | Akutsu et al. | |
| 2013/0238851 A1* | 9/2013 | Chang | G06F 3/0685 711/E12.017 |
| 2016/0371145 A1 | 12/2016 | Akutsu et al. | |

FOREIGN PATENT DOCUMENTS

| | | |
|---|---|---|
| JP | 2013-543996 A | 12/2013 |
| JP | 2020-144913 A | 9/2020 |
| JP | 2021-096513 A | 6/2021 |

OTHER PUBLICATIONS

Japanese Office Action dated Aug. 8, 2023 for Japanese Patent Application No. 2021-147792.

* cited by examiner

*Primary Examiner* — Khoa D Doan
(74) *Attorney, Agent, or Firm* — Volpe Koenig

(57) ABSTRACT

To set an appropriate buffer area in a storage system that performs hierarchical storage management. The storage system includes a storage device that provides a storage pool and a storage management unit that manages the storage pool in a tiered manner. The storage pool is provided with a first tier, a second tier, a third tier, and a third tier buffer which is a buffer area used as a buffer when reading or writing data from or to the third tier which is a buffer target tier. The storage management unit determines a size of the third tier buffer based on an access frequency of the third tier.

12 Claims, 26 Drawing Sheets

(a) EXAMPLE OF BUFFER-DEDICATED AREA (a) EXAMPLE OF BUFFER-DEDICATED AREA (b) EXAMPLE OF BUFFER AND UPPER TIER SHARING AREA

FIG. 7
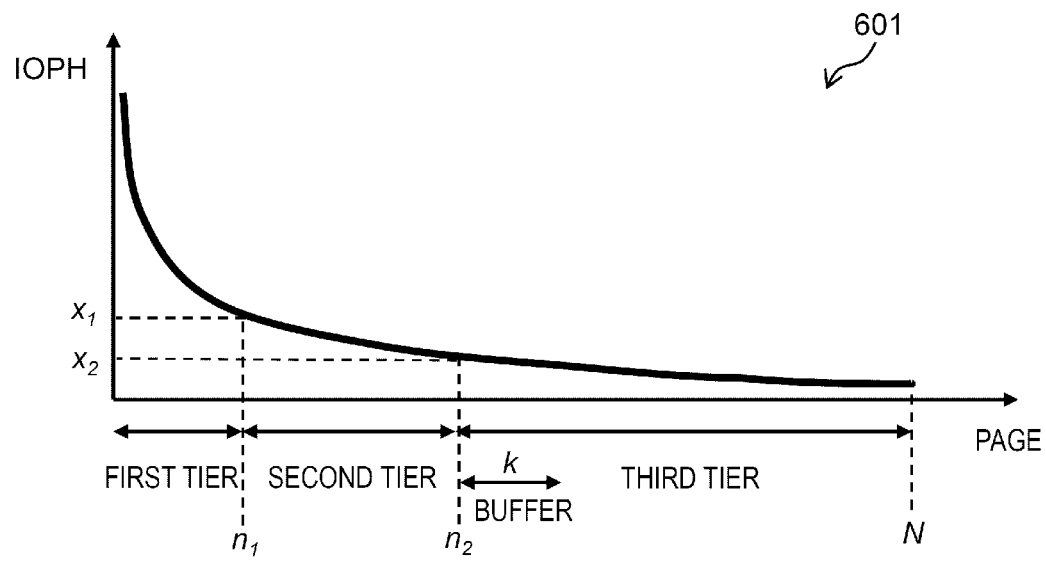
EXAMPLE OF FREQUENCY DISTRIBUTION
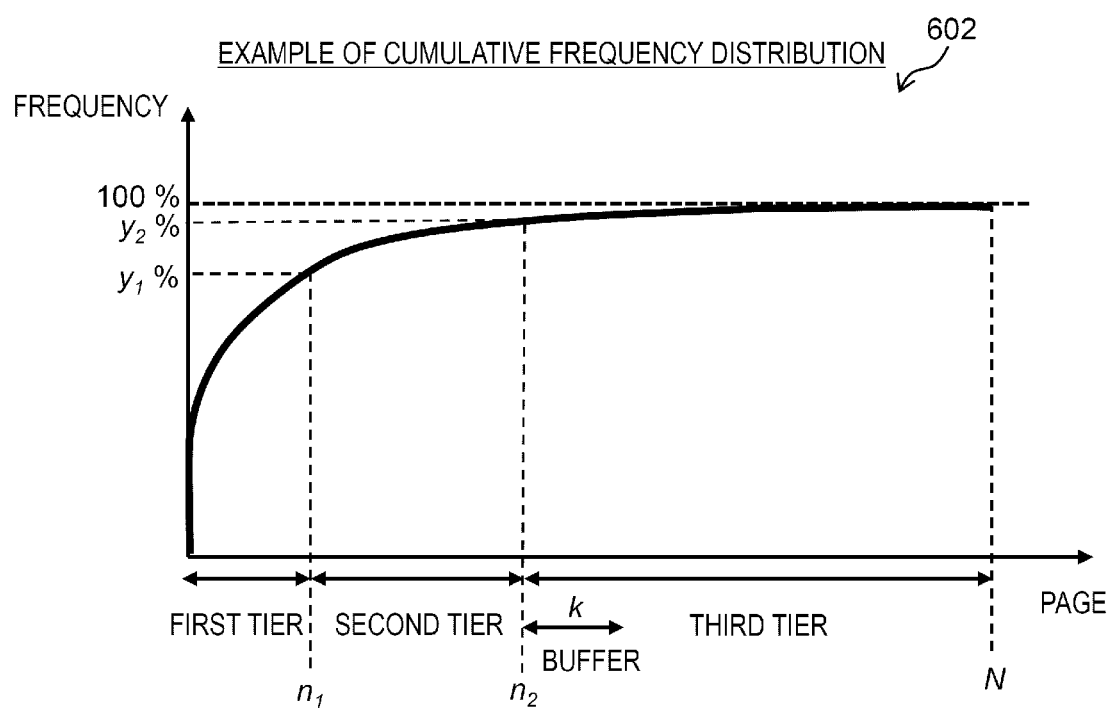
EXAMPLE OF CUMULATIVE FREQUENCY DISTRIBUTION

| PERFORMANCE INFORMATION TABLE | | | | | | | | |
|---|---|---|---|---|---|---|---|---|
| PAGE NUMBER 1201 | IOPH 1202 | | | | TRANSFER RATE 1203 | | | ACCESS TIME 1204 |
| | LATEST VALUE (IOPH) 1221 | | COUNTER (IO NUMBER) 1222 | | LATEST VALUE (KB/H) 1231 | | COUNTER (KB) 1232 | |
| | read | write | read | write | read | write | read | write | |
| L1-P1 | 10 | 2 | 1 | 5 | 100 | 31 | 1 | 4 | 2021/01/01 10:00:01 |
| L1-P2 | 21 | 50 | 3 | 6 | 201 | 302 | 2 | 5 | 2021/01/01 10:00:02 |
| L1-P3 | 50 | 10 | 4 | 1 | 302 | 52 | 3 | 2 | 2021/01/01 10:00:01 |
| L1-P4 | 1 | 8 | 2 | 2 | 23 | 141 | 2 | 1 | 2021/01/01 10:00:01 |
| L1-P5 | 0 | 0 | 0 | 0 | 0 | 0 | 0 | 0 | 2020/09/23 23:10:01 |
| ... | | | | | | | | | |

| POOL PAGE AND VOLUME PAGE MANAGEMENT TABLE | | |
|---|---|---|
| 1301 | 1302 | 1303 |
| POOL PAGE NUMBER | VOLUME NUMBER | VOLUME PAGE NUMBER |
| L1-P1 | V1 | V1-P1 |
| L1-P2 | V1 | V1-P2 |
| L1-P3 | V1 | V1-P3 |
| L1-P4 | V1 | V1-P4 |
| L1-P5 | V2 | V2-P1 |
| L1-P6 | V2 | V2-P2 |
| ... | | |

FIG. 12

TIER SIZE OR BUFFER SIZE MANAGEMENT TABLE (1500)

| TIER OR BUFFER NUMBER (1501) | SIZE (1502) | STORING DEVICE (1503) |
|---|---|---|
| T1 | 10TB | INTERNAL NVMe |
| T2 | 100TB | INTERNAL HDD |
| T3 | 300TB | OBJECT STORAGE |
| B3 (T3 BUFFER) | 20TB | INTERNAL HDD |
| | | |
| | | |
| | | |
| | | |

FIG. 13

| TIER PAGE AND OBJECT MANAGEMENT TABLE ||
|---|---|
| TIER PAGE NUMBER | OBJECT ID |
| T3-P1 | 56FD1245 |
| T3-P2 | 234FED6A |
| T3-P3 | AA098FBC |
| T3-P4 | C0752FFF |
| T3-P5 | F1026FEA |
| T3-P6 | BBC00789 |
| ... | |

FIG. 14

| BUFFER PAGE AND OBJECT MANAGEMENT TABLE ||
|---|---|
| BUFFER PAGE NUMBER | OBJECT ID |
| B3-P1 | 1F1E45E2 |
| B3-P2 | 223A679B |
| B3-P3 | 35A90BCC |
| B3-P4 | 10908632 |
| B3-P5 | 19A008BA |
| B3-P6 | C9DD0EEF |
| ... | |

STORAGE SYSTEM

BACKGROUND OF THE INVENTION

1. Field of the Invention

The present invention relates to a storage system.

2. Description of the Related Art

Regarding the invention, the following JP-A-2020-144913 is known. JP-A-2020-144913 describes a distributed storage system, in which in a plurality of nodes each including a storage device, a first node receives a plurality of pieces of user data together with a write request from a high-level apparatus, generates a first redundant code based on the received plurality of pieces of user data, sends the generated first redundant code and the plurality of pieces of user data to other nodes, and stores the plurality of pieces of user data in the storage device, and a second node receives the user data and the first redundant code from other nodes, generates a second redundant code based on the received user data and first redundant code, and stores the second redundant code in the storage device.

In recent years, a use of an object storage that handles data for each object has been increasing. In a storage system having the object storage in addition to a file storage and a block storage, hierarchical storage management for tiering and managing storages according to types of data stored in the storages is generally performed. In such hierarchical storage management, it is necessary to allocate a buffer area such as a read cache or a write buffer for data having large access latency, such as data stored in an external object storage. Since a part of a storage capacity of an upper tier is used to allocate the buffer area, it is necessary to set an appropriate buffer area in order to provide a low-cost and high-performance storage service. However, the technique described in JP-A-2020-144913 is insufficient to deal with such a point.

SUMMARY OF THE INVENTION

Therefore, an object of the invention is to set an appropriate buffer area in a storage system that performs hierarchical storage management.

A storage system according to a first aspect of the invention includes a processor that operates a storage management unit, a storage device that stores data, and a storage pool with a plurality of types of storages including at least the storage device. The storage management unit tiers a storing area of the storage pool into a plurality of tiers, allocates the tiers to the storages having different access performances, determines the tier for storing data from the plurality of tiers based on an access frequency of the data, provides, in the storage pool, a buffer area for temporarily storing data stored in a buffer target tier which is at least one of the plurality of tiers, allocates the buffer area to a storage having a higher access performance than a storage to which the buffer target tier is allocated, and determines a size of the buffer area based on an access frequency of the buffer target tier.

A method for managing a storage system according to a second aspect of the invention tiers a storing area of a storage pool into a plurality of tiers, allocates the tiers to storages having different access performances, determines the tier for storing data from the plurality of tiers based on an access frequency of the data, provides, in the storage pool, a buffer area for temporarily storing data stored in a buffer target tier which is at least one of the plurality of tiers, allocates the buffer area to a storage having a higher performance than that of a storage to which the buffer target tier is allocated, and determines a size of the buffer area based on an access frequency of the buffer target tier.

According to the invention, the appropriate buffer area can be set in the storage system that performs the hierarchical storage management.

BRIEF DESCRIPTION OF THE DRAWINGS

FIG. 7 illustrates graphs each illustrating an example of an access frequency of each pool page.

FIG. 10 is a diagram illustrating an example of a pool page and volume page management table.

FIG. 12 is a diagram illustrating an example of a tier size or buffer size management table.

FIG. 13 is a diagram illustrating an example of a tier page and object management table.

FIG. 14 is a diagram illustrating an example of a buffer page and object management table.

DESCRIPTION OF THE PREFERRED EMBODIMENTS

Figure 1:
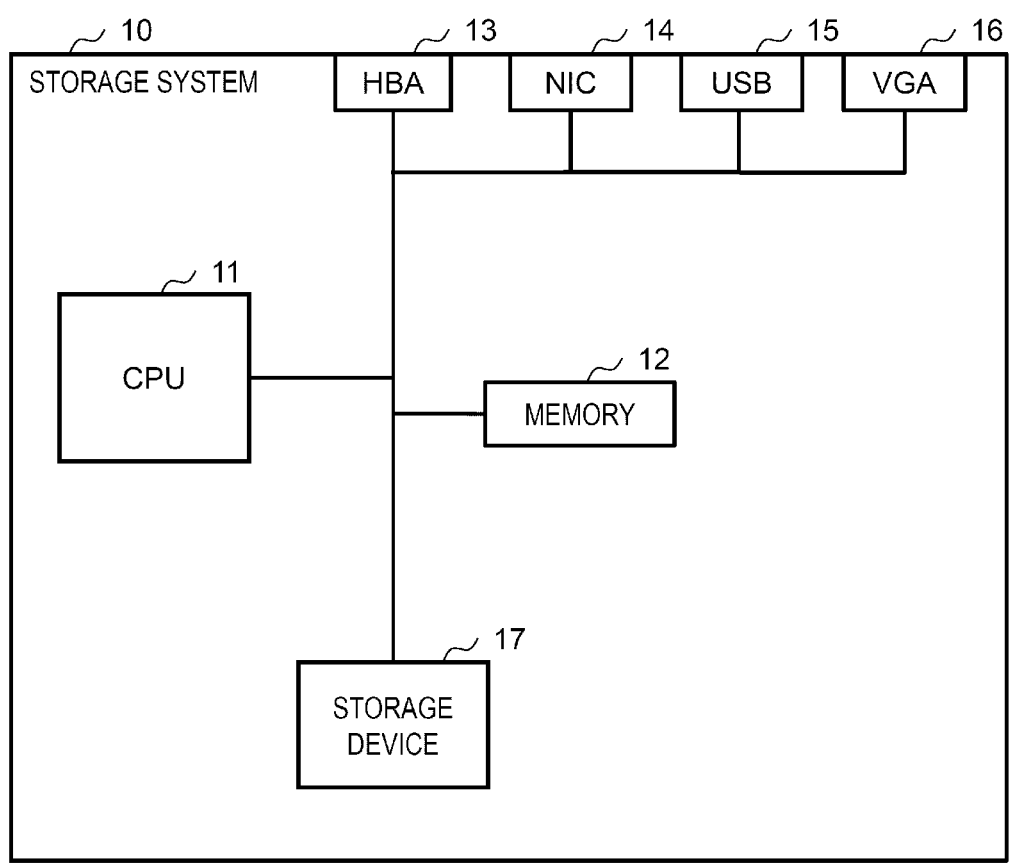
FIG. 1 is a hardware block diagram of a storage system according to an embodiment of the invention.

Hereinafter, an embodiment of the invention will be described with reference to the drawings. For clarity of explanation, the following description and drawings may be omitted and simplified as appropriate. The invention is not limited to the present embodiment, and all application examples corresponding to ideas of the invention are included in a technical scope of the invention. Unless otherwise limited, each component may be either plural or singular.

In the following description, various kinds of information are described in an expression of "xxx table", and alternatively the various types of information may be expressed with a data structure other than the table. That is, the "xxx table" can be referred to as "xxx information" in order to indicate that the various types of information do not depend on the data structure.

In the following description, when the same kind of an element is described without distinction, a reference sign (or a common part in the reference sign) is used, and when the same kind of the element is described with distinction, an ID of the element (or the reference sign of the element) may be used.

In the following description, a "storage system" and a "storage with an external connection function" are systems including one or more computers. Therefore, the "storage system" and the "storage with the external connection function" may be one computer, a plurality of computers, or in addition to the computer, may also include a device other than the computer. The one or more computers typically include at least one physical computer.

The one or more computers may include at least one virtual computer. In this case, a resource (such as the storage device or a drive described later) included in the virtual computer is also configured as a virtual resource.

In the following description, a "storage client computer" and a "management terminal" may be configured with one or more computers.

In the following description, processing may be explained with a "program" or a process of the "program" as a subject, since the program is executed by a processor (for example, a central processing unit (CPU)) to perform determined processing while appropriately using a storing resource (for example, a memory) and/or a communication interface device (for example, a communication port), and thus the subject of the processing may be the processor. The processor operates as a functional unit that implements a predetermined function by operating according to the program. A device and a system including the processor are a device and a system including the functional unit.

In the following description, the "storage system" and the "storage with the external connection function" mean computers each having a physical storage device, and typically may be computers each having a non-volatile storage device (for example, an auxiliary storage device). The auxiliary storage device may be, for example, a hard disk drive (HDD) or a solid state drive (SSD). Different types of storage devices may be mixed.

Hereinafter, an embodiment of the invention will be described.

FIG. 1 is a hardware block diagram of a storage system according to the embodiment of the invention. A storage system 10 of the present embodiment is configured with, for example, a computer such as a PC or a server, and includes a central processing unit (CPU) 11, a memory 12, a host bus adapter (HBA) 13, a network interface card (NIC) 14, a universal serial bus (USB) 15, a video graphic array (VGA) 16, and a storage device 17. These components are connected to each other by an internal bus or an external bus.

The CPU 11 manages and controls the storage device 17 by executing various programs stored in the memory 12. Various tables are stored in the memory 12, and when the programs are executed, data stored in the tables is referenced and updated as necessary. Details of the tables and the programs stored in the memory 12 will be described later.

The HBA 13, the NIC 14, the USB 15, and the VGA 16 each perform interface processing on data input or output to or from a predetermined external device. The interface processing with the external device may be performed by using a device other than the above components.

The storage device 17 is a non-volatile recording medium capable of storing various data, and reading and writing of the data to and from the storage device 17 are performed under control of the CPU 11. The storage device 17 is configured by combining, for example, a non-volatile memory express (NVMe) drive, a serial attached SCSI (SAS) drive, and a serial ATA (SATA) drive, and the like.

Figure 2:
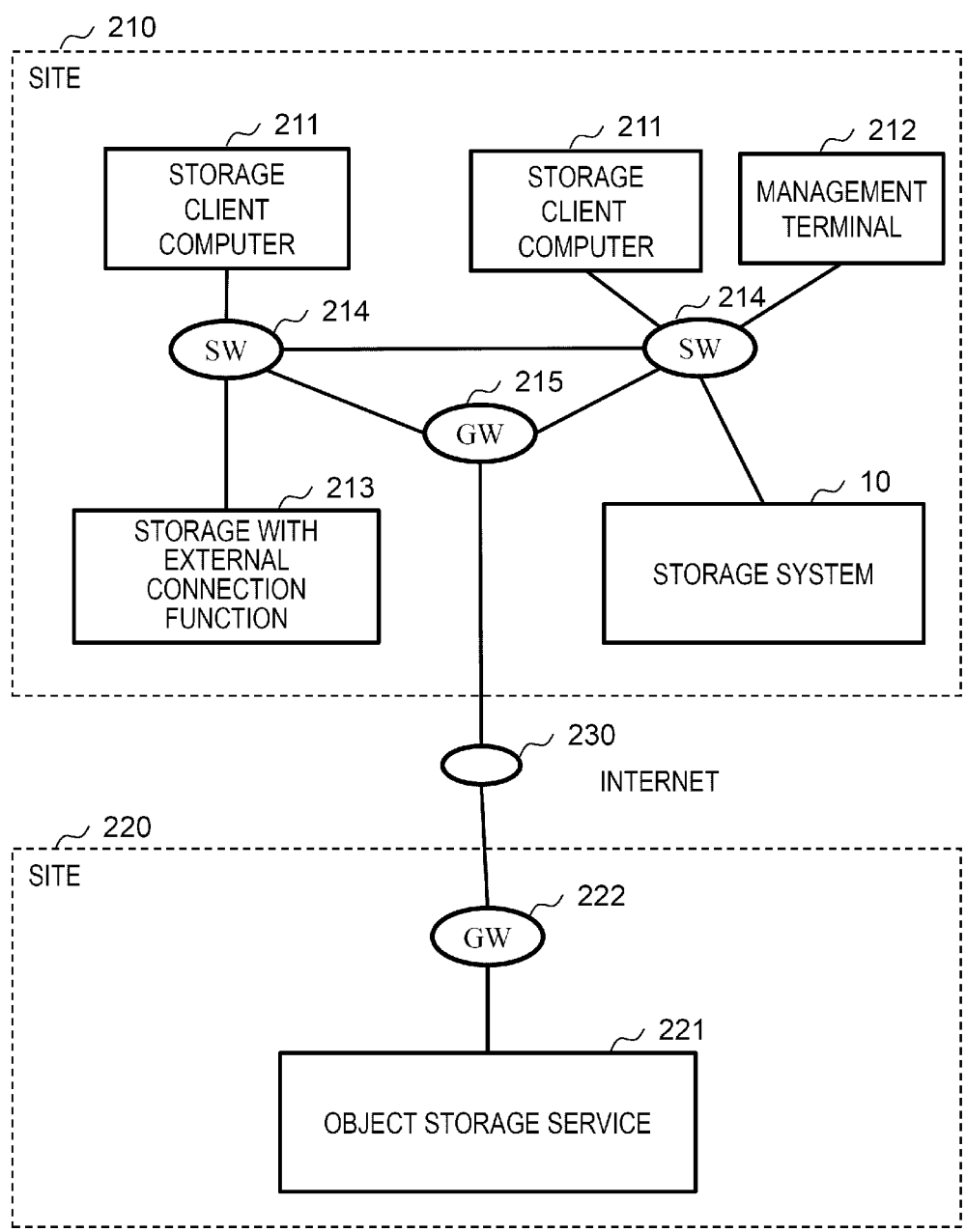
FIG. 2 is a diagram illustrating a configuration example of a computer system including the storage system according to the embodiment of the invention.
Figure 3:
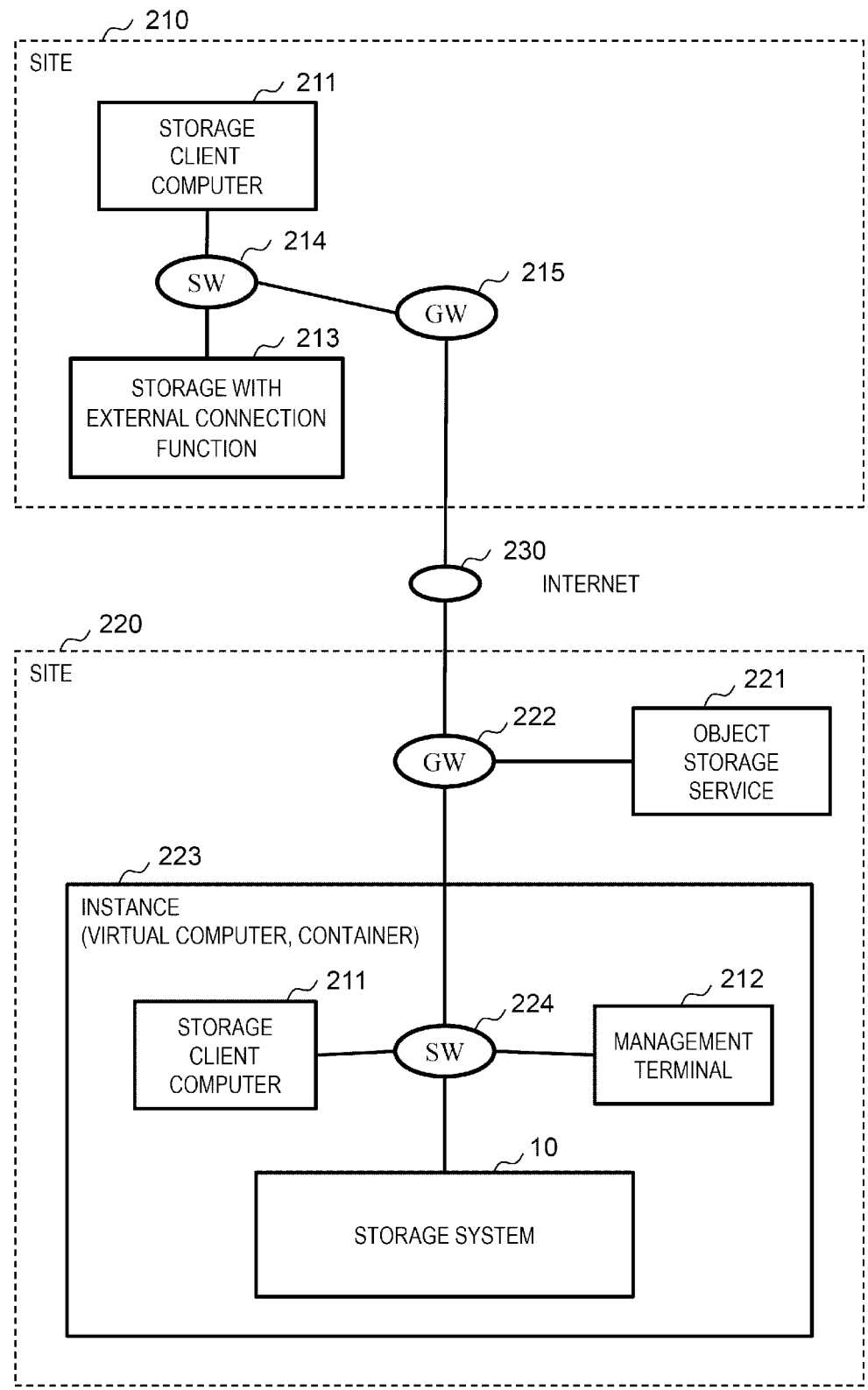
FIG. 3 is a diagram illustrating a configuration example of a computer system including the storage system according to the embodiment of the invention.

FIGS. 2 and 3 are diagrams each illustrating a configuration example of a computer system including the storage system according to the embodiment of the invention. The computer system in FIG. 2 is a configuration example in which the storage system 10 is used in an on-premises environment, and a site 210 and a site 220 are connected via an Internet 230.

At the site 210 in the computer system in FIG. 2, storage client computers 211, a management terminal 212, a storage with an external connection function (hereinafter, simply referred to as the "storage") 213, and the storage system 10 are connected to each other via switches 214. These components are connected to the Internet 230 via a gateway 215. The storage client computers 211 are computers each using a storage service provided by the storage system 10 or the storage 213, and are configured with, for example, a PC and various Internet of Things (IoT) devices. In FIG. 2, two storage client computers 211 exist at the site 210, but the number of the storage client computers 211 is not limited thereto. The management terminal 212 is a terminal operated by an administrator of the storage system 10. The administrator can manage the storage system 10 by using the management terminal 212.

The site 220 includes an object storage service 221. The object storage service 221 is an object storage provided in a cloud environment to the storage client computers 211, the storage system 10, and the storage 213, and is connected to the Internet 230 via a gateway 222. Since the object storage service 221 is connected to the site 210 via the Internet 230, an access performance is lower than that of the storage at a site 210 side.

In the computer system of FIG. 2, the storage system 10 controls the storage device 17 provided in the storage system 10 (see FIG. 1), the storage 213, and the object storage service 221, and provides a storage service using these storage capacities to the storage client computers 211 in response to requests from the storage client computers 211.

The computer system in FIG. 3 is a configuration example when the storage system 10 is used as an instance in the cloud environment, and similar to the computer system in FIG. 2, the site 210 and the site 220 are connected via the Internet 230.

At the site 210 in the computer system in FIG. 3, the storage client computer 211 and the storage 213 are connected to each other via the switch 214, and are connected to the Internet 230 via the gateway 215.

The site 220 includes the object storage service 221 and an instance 223. The instance 223 includes the storage client computer 211, the management terminal 212, and the storage system 10 as a virtual system implemented by using a virtual computer and a container. The above components are connected to each other within the instance 223 via a virtual switch 224. The object storage service 221 and the instance 223 are connected to the Internet 230 via the gateway 222.

In FIG. 3, the site 210 and the site 220 each include one storage client computer 211, but the number of the storage client computers 211 at each site is not limited thereto. The storage client computer 211 may exist only in one of the site 210 and the site 220.

Similar to the computer system of FIG. 2, in the computer system in FIG. 3, the storage system 10 controls the storage device 17 provided in the storage system 10 (see FIG. 1), the storage 213, and the object storage service 221, and provides the storage service using these storage capacities to the storage client computers 211 in response to the request from the storage client computer 211.

In the computer systems of FIGS. 2 and 3, the storage client computers 211 may directly access the storage 213 without going through the storage system 10 to use the storage capacity of the storage 213. The site 210 may not be provided with the storage 213.

Figure 4:
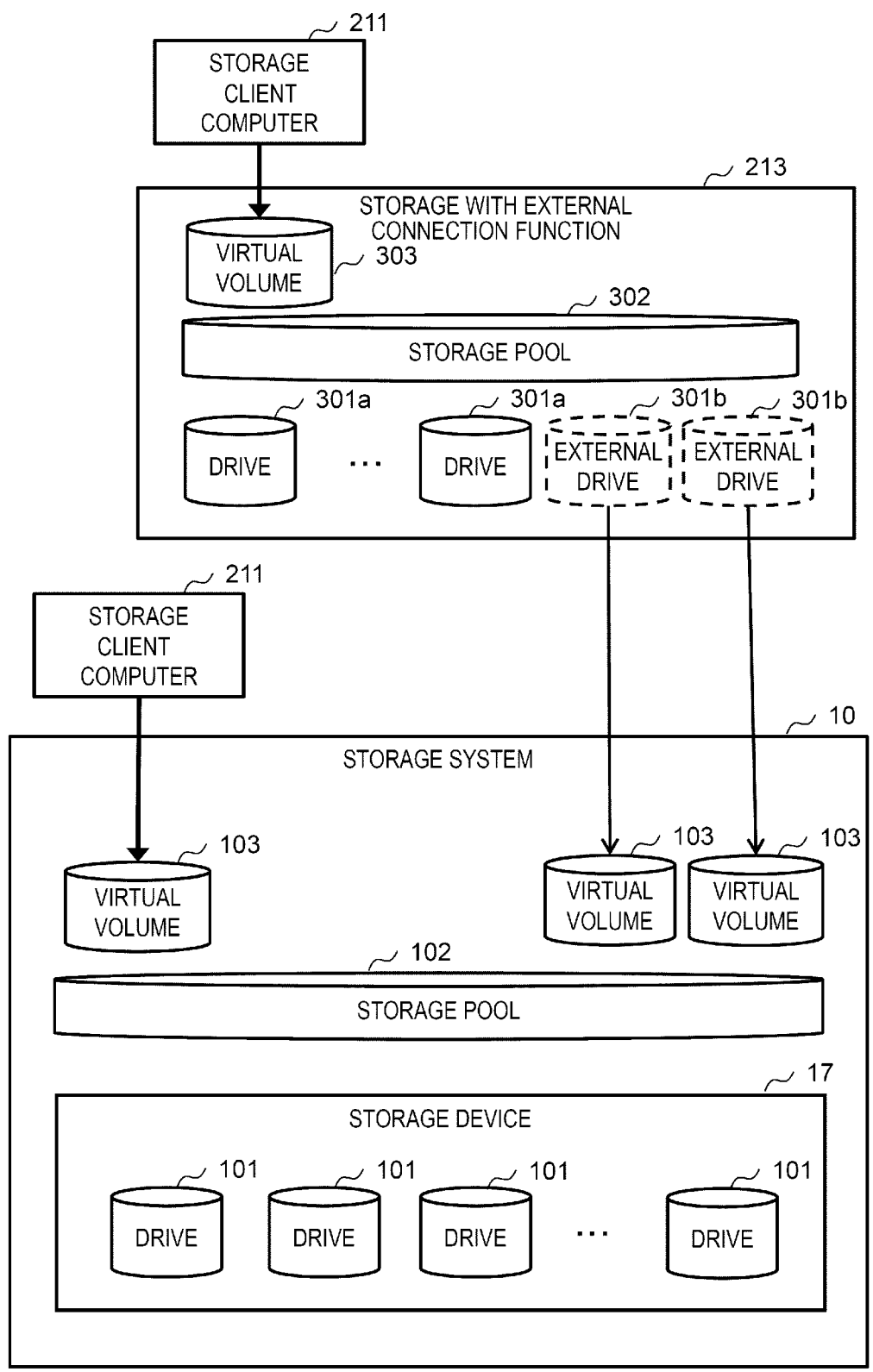
FIG. 4 is a diagram illustrating a correspondence relation of resources in the storage system according to the embodiment of the invention.

FIG. 4 is a diagram illustrating a correspondence relation of resources in the storage system according to the embodiment of the invention. For example, as illustrated in FIG. 4, the storage system 10 of the present embodiment includes a storage pool 102 implemented by combining a plurality of drives 101 (the storage device 17 in FIG. 1). By accessing the storage pool 102 from the storage client computer 211 directly or via the storage 213, the storage system 10 can provide virtual volumes 103 to the storage client computer 211.

Similarly, the storage 213 includes a storage pool 302 implemented by combining a plurality of drives 301a, and provides a virtual volume 303 to the storage client computer 211. The storage pool 302 may be configured by using the drives 301a and the virtual volumes 103 provided by the storage system 10 as external drives 301b.

The storage pool 102 illustrated in FIG. 4 does not include the object storage service 221 illustrated in FIGS. 2 and 3, and the storage capacity provided by the object storage service 221 may be used as a part of the storage pool 102.

Next, a logical structure of the storage pool 102 in the storage system 10 will be described. The storage system 10 of the present embodiment employs hierarchical storage management for tiering and managing the storage pool 102.

Figure 5A:
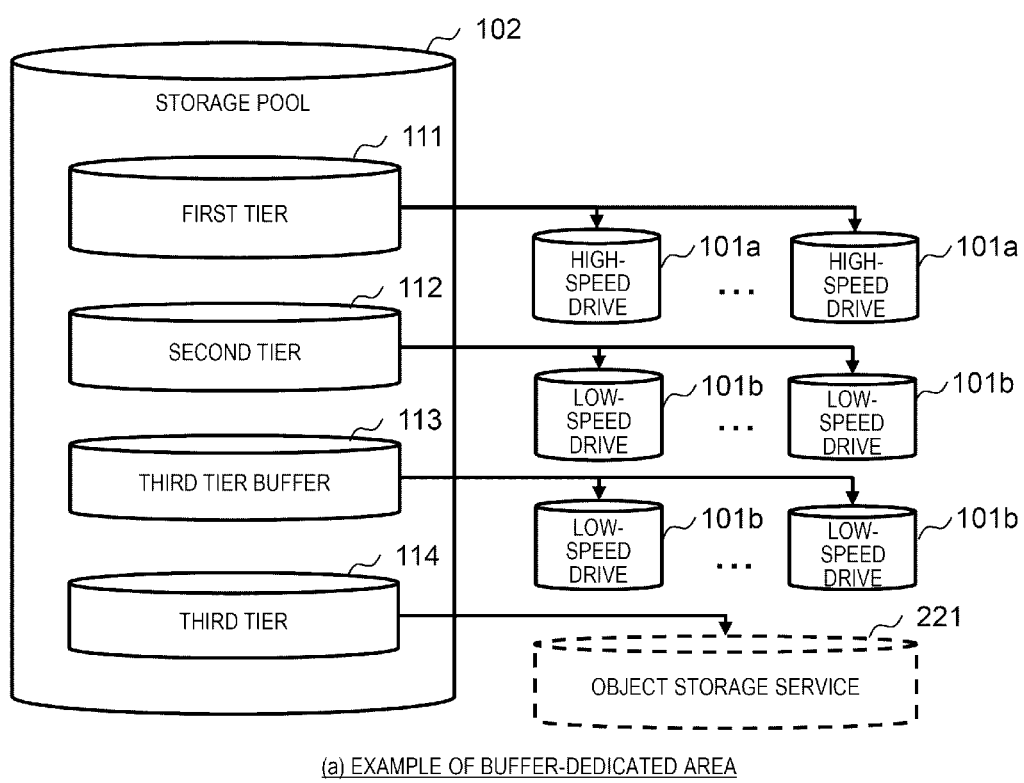
FIGS. 5A and 5B are diagrams illustrating examples of tier structures of a storage pool.
Figure 5B:
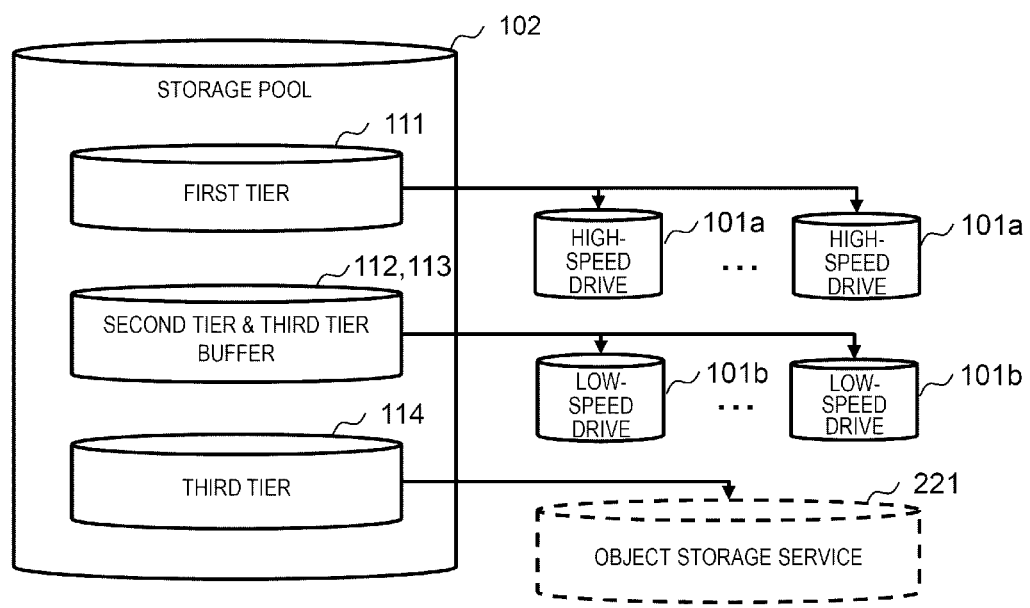

FIGS. 5A and 5B are diagrams illustrating examples of tier structures of the storage pool 102. FIG. 5A illustrates the example of the tier structure when a buffer-dedicated area is provided in the storage pool 102. In this case, for example, the storage pool 102 includes a first tier 111, a second tier 112, a third tier buffer 113, and a third tier 114.

The first tier 111 is a storage tier for storing data that requires high-speed access, and the data stored in this tier is physically stored in high-speed drives 101a. The second tier 112 is a storage tier for storing data that allows lower-speed access compared with the first tier 111, and the data stored in this tier is physically stored in low-speed drives 101b. The third tier 114 stores data that has a lower access frequency compared with the first tier 111 and the second tier 112, and the data stored in this tier is physically stored in the storage provided by the object storage service 221. In this way, the first tier 111, the second tier 112, and the third tier 114 are allocated to the storages having different access performances under the control of the CPU 11. The third tier buffer 113 is a buffer area used as a read cache and a write buffer when reading and writing data stored in the third tier 114, and is allocated to the low-speed drives 101b as in the second tier 112, and may be allocated to other storage devices in the storage system 10 such as the high-speed drives 101a and the memory. The data written in the third tier 114 is temporarily stored in the third tier buffer 113, and then stored in the third tier 114 (a write buffer), or the data read from the third tier 114 is temporarily stored in the third tier buffer 113, and when a read request is received while read target data exists in the third tier buffer 113, the data is read from the third tier buffer 113 instead of the third tier 114 (a read cache). In this way, the CPU 11 controls the storage system 10 so as to allocate the third tier buffer 113 to a storage (the low-speed drive 101b, the high-speed drive 101a, or the like) with a higher access performance than the object storage service 221 to which the third tier 114 as a buffer target is allocated.

FIG. 5B illustrates an example of a tier structure when a storage tier and a buffer area are shared in the storage pool 102. In this case, for example, the storage pool 102 uses a part of the second tier 112 as the third tier buffer 113. The first tier 111 and the third tier 114 are the same as those in FIG. 5A.

In the storage system 10 of the present embodiment, management can be performed by using the tier structure of either FIG. 5A or FIG. 5B. Although FIGS. 5A and 5B each illustrate the example in which the storage pool 102 has a three-stage tier structure from the first tier 111 to the third tier 114, the number of tiers set in the storage pool 102 is not limited thereto.

Figure 6:
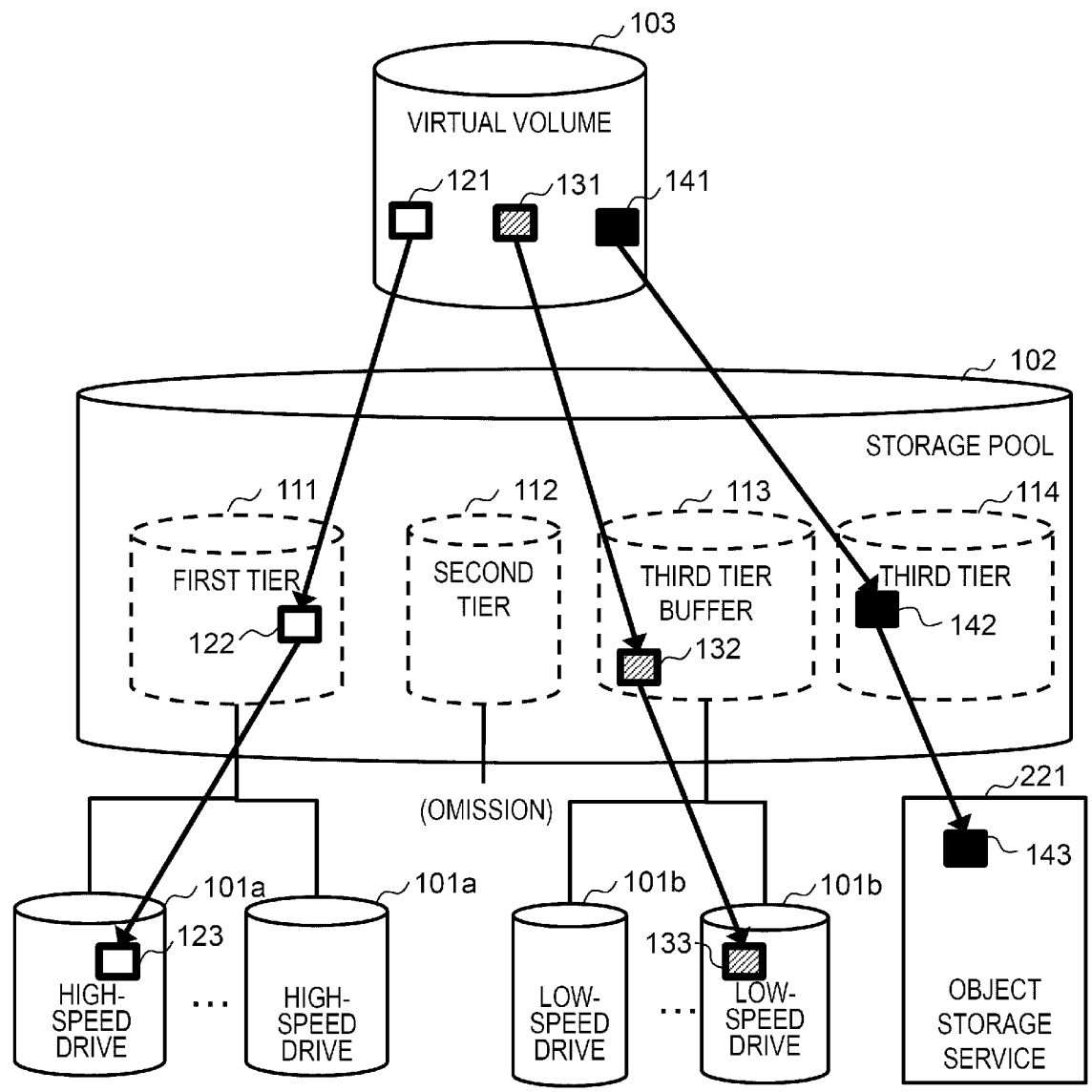
FIG. 6 is a diagram illustrating a correspondence relation of pages in the storage system.

FIG. 6 is a diagram illustrating a correspondence relation of pages in the storage system 10. As illustrated in FIGS. 4 and 5, in the storage system 10, the storage pool 102 having the tier structure is configured with the plurality of drives 101 (the high-speed drives 101a and the low-speed drives 101b) and the object storage service 221, and the storage pool 102 is provided to the storage client computer 211 as the virtual volume 103. Therefore, each of pages of the virtual volume 103 is associated with a page in any tier of the storage pool 102 and a page in any of the plurality of drives 101 or an object of the object storage service 221.

Specifically, for example, as illustrated in FIG. 6, a page 121 in the virtual volume 103 corresponds to a page 122 in the first tier 111 of the storage pool 102 and a page 123 in any of the plurality of high-speed drives 101a. A page 131 in the virtual volume 103 corresponds to a page 132 in the third tier buffer 113 of the storage pool 102 and a page 133 in any of the plurality of low-speed drives 101b. Similarly, a page 141 in the virtual volume 103 corresponds to a page 142 in the third tier 114 of the storage pool 102 and a page 143 in the object of the object storage service 221.

In the storage system 10 of the present embodiment, the correspondence relation of the pages described above is managed by using a predetermined management table stored in the memory 12. Details of the management table will be described later.

Next, a method for determining a size of each tier of the storage pool 102 in the storage system 10 of the present embodiment will be described. In the storage system 10 of the present embodiment, the size (the number of pages) of each tier set in the storage pool 102 is determined based on access frequencies of the pages in the storage pool 102 (hereinafter, referred to as "pool pages"). For example, the size of each tier can be determined such that all the pool pages within a predetermined access frequency range for the tiers are included.

FIG. 7 illustrates graphs each illustrating an example of the access frequencies of the pool pages in the storage pool 102. In FIG. 7, a graph 601 is an example illustrating the access frequencies of the pool pages by frequency distribution, where a horizontal axis represents a page number, and a vertical axis represents the access frequency (IOPH). A graph 602 is an example illustrating the access frequencies of the pool pages by cumulative frequency distribution, where a horizontal axis represents a page number, and a vertical axis represents a cumulative frequency of an access frequency for the entire storage pool 102. The page numbers on the horizontal axes in the graphs 601 and 602 represent a series of numbers when the pool pages are sorted in order from the one with a highest access frequency, and a minimum page number is 1 and a maximum page number is N. That is, it is assumed that a total number of the pages in the storage pool 102 is N, and each pool page is set with a page number from 1 to N in an access frequency order.

Based on the graph 601, the storage system 10 of the present embodiment can set sizes of the first tier 111, the second tier 112, and the third tier 114 in the storage pool 102, respectively, by the following method, for example.

First, a pool page (a page number: n1) having an access frequency value x1 is selected in the graph 601 such that pool pages each having a predetermined access frequency of x1 or more are included in the first tier 111. Then, the size of the first tier 111 is determined by obtaining a total size (a total number of pages) of the pool pages with page numbers 1 to n1. Next, a pool page (a page number: n2) having an access frequency value x2 is selected in the graph 601 such that pool pages each having a predetermined access frequency of x2 or more and less than x1 (x1>x2) is included in the second tier 112. Then, the size of the second tier 112 is determined by obtaining a total size (a total number of pages) of the pool pages with page numbers n1+1 to n2. Finally, the size of the third tier 114 is determined such that all remaining pool pages are included in the third tier 114.

Based on the graph 602, the storage system 10 of the present embodiment can set the sizes of the first tier 111, the second tier 112, and the third tier 114 in the storage pool 102, respectively, by the following method, for example.

First, a pool page (a page number: n1) is selected in the graph 602 such that pool pages from a pool page with a highest access frequency to a pool page with a predetermined cumulative frequency y1 are included in the first tier 111. The cumulative frequency y1 is substantially a value that can be freely set by the administrator. However, if a physical restriction is present on a resource, the cumulative frequency y1 is a value determined by an upper limit of an access amount or a capacity with which the high-speed drives 101 which are storage devices corresponding to the first tier is capable of dealing. This is not the case if no physical restrictions are present on the resource, such as in a public cloud. The size of the first tier 111 is determined by obtaining the total size (the total number of the pages) of the pool pages with the page numbers 1 to n1. Next, a pool page (a page number: n2) corresponding to a cumulative frequency value y2 is selected in the graph 602 such that the pool pages with the access frequencies aggregated to be the predetermined cumulative frequency y2 (y2>y1) are included in the second tier 112. The size of the second tier 112 is determined by obtaining a total size (a total number of pages) of the pool pages with page numbers n1+1 to n2. Finally, the size of the third tier 114 is determined such that all remaining pool pages are included in the third tier 114.

In the storage system 10 of the present embodiment, the sizes of the first tier 111, the second tier 112, and the third tier 114 can be set by the methods as described above. In this case, either the method illustrated in the graph 601 or the method illustrated in the graph 602 may be used. In the present description, the methods are described in a case where the sizes of all the tiers are variable, but the sizes of some tiers or all the tiers may be fixed. Regardless of which method is used, a buffer size k of the third tier buffer 113 is smaller than the size of the third tier 114. A method for determining the buffer size k will be described later.

Next, the tables and the programs in the storage system 10 of the present embodiment will be described below. In the storage system 10 of the present embodiment, the various tables and programs are stored in the memory 12 as described above, and the storage system 10 is controlled by using the tables and the programs. Accordingly, the hierarchical storage management for tiering and managing the storage pool 102 provided by the storage system 10 is implemented as illustrated in FIGS. 5A and 5B.

Figure 8:
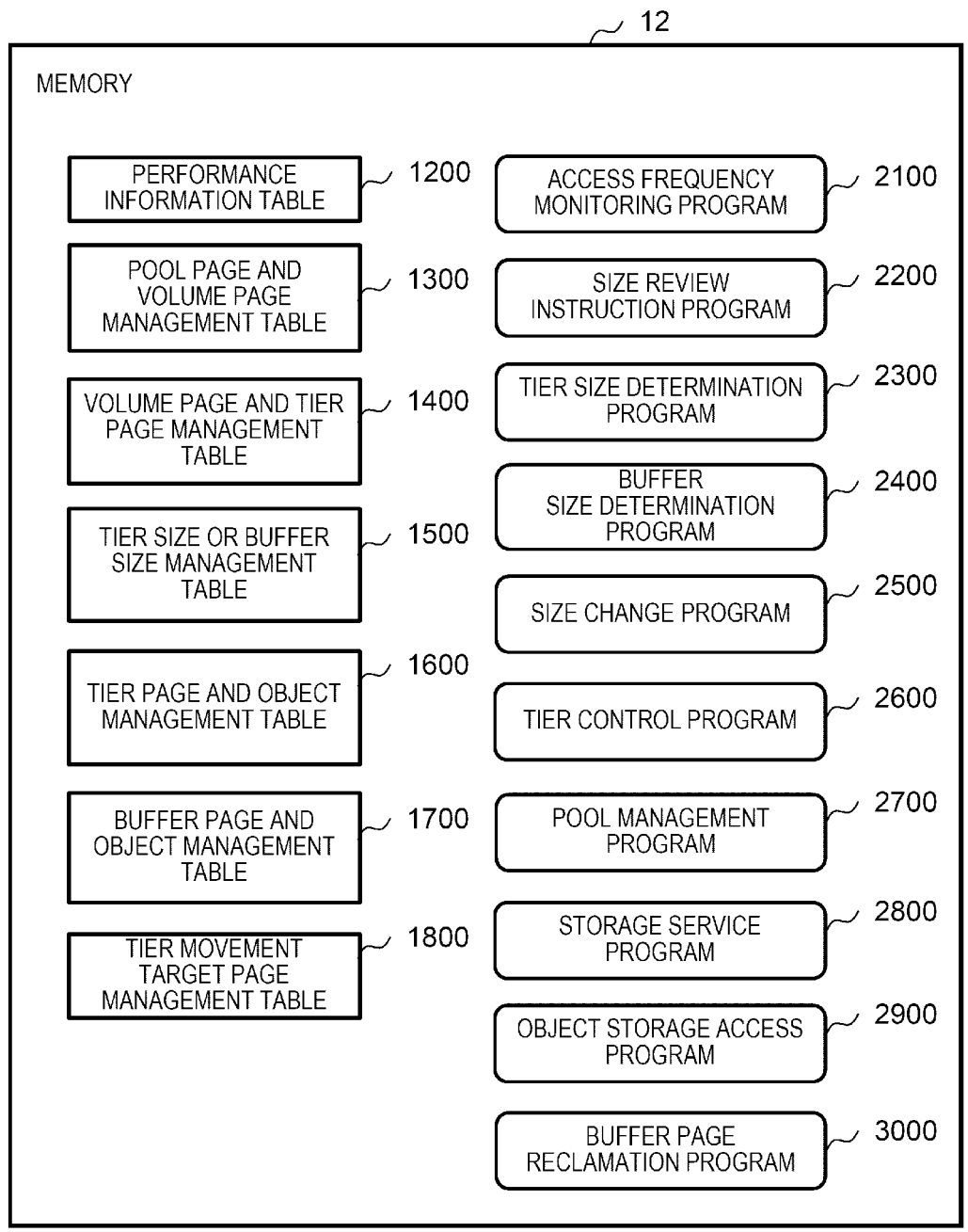
FIG. 8 is a diagram illustrating an example of tables and programs stored in a memory.

FIG. 8 is a diagram illustrating an example of the tables and the programs stored in the memory 12. As illustrated in FIG. 8, the memory 12 stores tables including a performance information table 1200, a pool page and volume page management table 1300, a volume page and tier page management table 1400, a tier size or buffer size management table 1500, a tier page and object management table 1600, a buffer page and object management table 1700, and a tier movement target page management table 1800, and programs including an access frequency monitoring program 2100, a size review instruction program 2200, a tier size determination program 2300, a buffer size determination program 2400, a size change program 2500, a tier control program 2600, a pool management program 2700, a storage service program 2800, an object storage access program 2900, and a buffer page reclamation program 3000.

The performance information table 1200 is a table showing performance information on the pages (the pool pages) in the storage pool 102. The pool page and volume page management table 1300 is a table showing a correspondence relation between the pool pages and pages of volumes (volume pages). The volume page and tier page management table 1400 is a table showing a correspondence relation between the volume pages and the pages of the tiers (tier pages) in the storage pool 102. The tier size or buffer size management table 1500 is a table showing sizes, set in the storage pool 102, of tiers including the first tier 111, the second tier 112, and the third tier 114, and the third tier buffer 113 for the object storage service 221, and showing types of devices storing these sizes. The tier page and object management table 1600 is a table showing a correspondence relation between numbers of the tier pages of the third tier 114 corresponding to the object storage service 221 and object IDs set for objects in the object storage service 221 corresponding to the pages. The buffer page and object management table 1700 is a table showing a correspondence relation between numbers of the pages of the third tier buffer 113 (buffer pages) for the object storage service 221 and object IDs of object pages of the object storage service 221. The tier movement target page management table 1800 is a table showing a current tier number and a destination tier number of each pool page targeted for tier movement.

Figure 9:
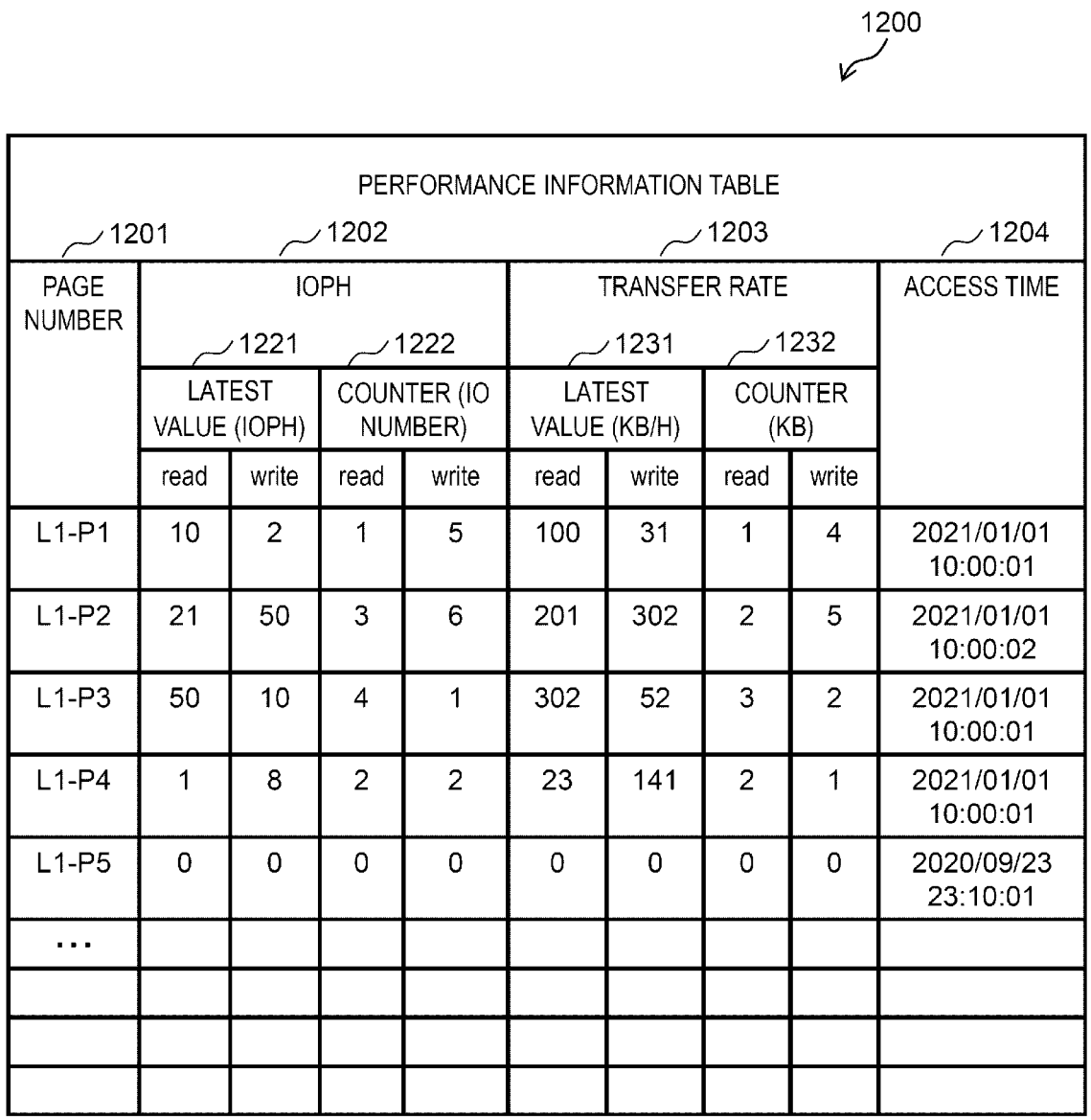
FIG. 9 is a diagram illustrating an example of a performance information table.

FIG. 9 is a diagram illustrating an example of the performance information table 1200. In the performance information table 1200, records are set corresponding to the pool pages of storage pool 102. Each of the records has information on a page number 1201, IOPH 1202, a transfer rate 1203, and an access time 1204.

The page number 1201 is a unique number for each pool page and is used to uniquely identify each pool page. The IOPH 1202 includes a latest value 1221 and a counter 1222.

The latest value 1221 represents the number of accesses (the access frequency) of each page in a latest certain period of time (for example, 1 hour), and the counter 1222 represents the number of accesses of the pages currently being aggregated. The transfer rate 1203 includes a latest value 1231 and a counter 1232. The latest value 1231 represents a transfer amount (transfer rate) of data of each page in the latest certain period of time (for example, 1 hour), and the counter 1232 represents the transfer amount of the data of the pages currently being aggregated. The access time 1204 represents a date and time when each page is last accessed.

When the storage pool 102 is accessed, the CPU 11 updates values in the counters 1222 and 1232 in records of a corresponding pool page in the performance information table 1200, respectively. After the certain period of time, the values in the counters 1222 and 1232 aggregated in the certain period of time are copied to the latest values 1221 and 1231, respectively, and after resetting the values in the counters 1222 and 1232 to 0, the aggregation of the values is restarted. Accordingly, a performance of the storage pool 102 can be obtained for each pool page.

FIG. 10 is a diagram illustrating an example of the pool page and volume page management table 1300. In the pool page and volume page management table 1300, records are set corresponding to the pool pages of storage pool 102. Each of the records has information on a pool page number 1301, a volume number 1302, and a volume page number 1303.

The pool page number 1301 is a unique number for each pool page and corresponds to the page number 1201 in the performance information table 1200 illustrated in FIG. 9. The volume number 1302 represents a number of the virtual volume 103 created on the pool. The volume page number 1303 represents a number of a volume page in each volume. In this drawing, for the sake of clarity, the volume number and the page number are represented in combination as the volume page number, a sequential number may be set for each volume.

When an access is required from the storage client computer 211 to the storage pool 102, the CPU 11 can access a corresponding volume page of the storage device 17 or the object storage service 221 by referring to the pool page and volume page management table 1300.

Figure 11:
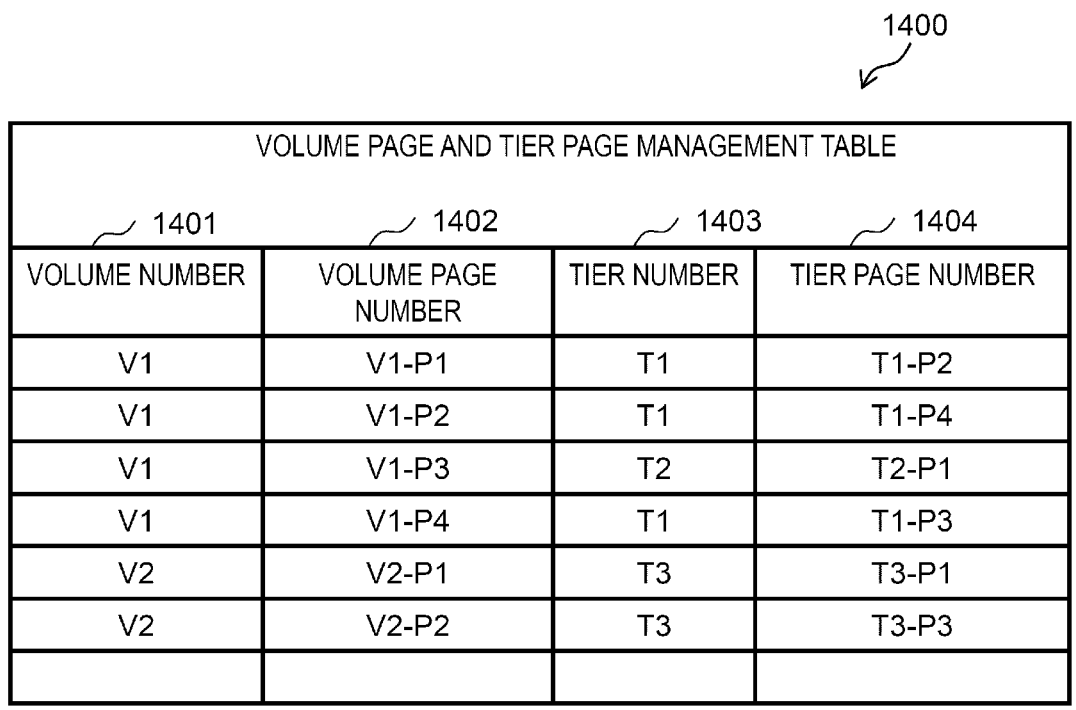
FIG. 11 is a diagram illustrating an example of a volume page and tier page management table.

FIG. 11 is a diagram illustrating an example of the volume page and tier page management table 1400. In the volume page and tier page management table 1400, records are set corresponding to the volume pages of the storage device 17 and the object storage service 221. Each of the records has information on a volume number 1401, a volume page number 1402, a tier number 1403, and a tier page number 1404.

The volume number 1401 represents the number of the virtual volume 103 created on the pool, and corresponds to the volume number 1302 in the pool page and volume page management table 1300 illustrated in FIG. 10. The volume page number 1402 is a unique number for each volume and corresponds to the volume page number 1303 in the pool page and volume page management table 1300 illustrated in FIG. 10. The tier number 1403 represents the tier number of the storage pool 102 corresponding to the volume to which each volume page belongs. The tier page number 1404 represents a number of a tier page corresponding to the volume page and is a unique number for each tier.

The CPU 11 can acquire a correspondence relation between the volume page and the tier page by referring to the volume page and tier page management table 1400.

FIG. 12 is a diagram illustrating an example of the tier size or buffer size management table 1500. In the tier size or buffer size management table 1500, records are set corresponding to the tiers and the buffer of the storage pool 102. Each of the records has information on a tier or buffer number 1501, a size 1502, and a storing device 1503.

The tier or buffer number 1501 represents a tier number or a buffer number, and for example, the first tier 111, the second tier 112, and the third tier 114 are represented by tier numbers of "T1", "T2", and "T3", respectively, and the third tier buffer 113 is represented by a buffer number of "B3". The size 1502 represents a data size of each tier or the buffer. The storing device 1503 represents a type of the storage storing the tiers or the buffer, and is represented by characters representing types of the drives 101 of the storage system 10 and the object storage service 221.

The CPU 11 can acquire setting information of each tier and the buffer in the storage pool 102 by referring to the tier size or buffer size management table 1500.

FIG. 13 is a diagram illustrating an example of the tier page and object management table 1600. In the tier page and object management table 1600, records are set corresponding to the tier pages in the storage pool 102. Each of the records has information on a tier page number 1601 and an object ID 1602.

The tier page number 1601 represents a number of each tier page illustrated by the combination of the tier number and the page number, and corresponds to the tier page number 1404 in the volume page and tier page management table 1400 illustrated in FIG. 11. The object ID 1602 represents an ID of an object to which each tier page corresponds.

The CPU 11 can acquire a correspondence relation between the tier page and the object by referring to the tier page and object management table 1600.

FIG. 14 is a diagram illustrating an example of the buffer page and object management table 1700. In the buffer page and object management table 1700, records are set corresponding to the buffer pages in the storage pool 102. Each of the records has information on a buffer page number 1701 and an object ID 1702.

The buffer page number 1701 represents a number of each buffer page and is a unique number in the buffer. The object ID 1702 represents an ID of an object page to which each buffer page corresponds.

The CPU 11 can acquire a correspondence relation between the buffer page and the object by referring to the buffer page and object management table 1700.

Figure 15:
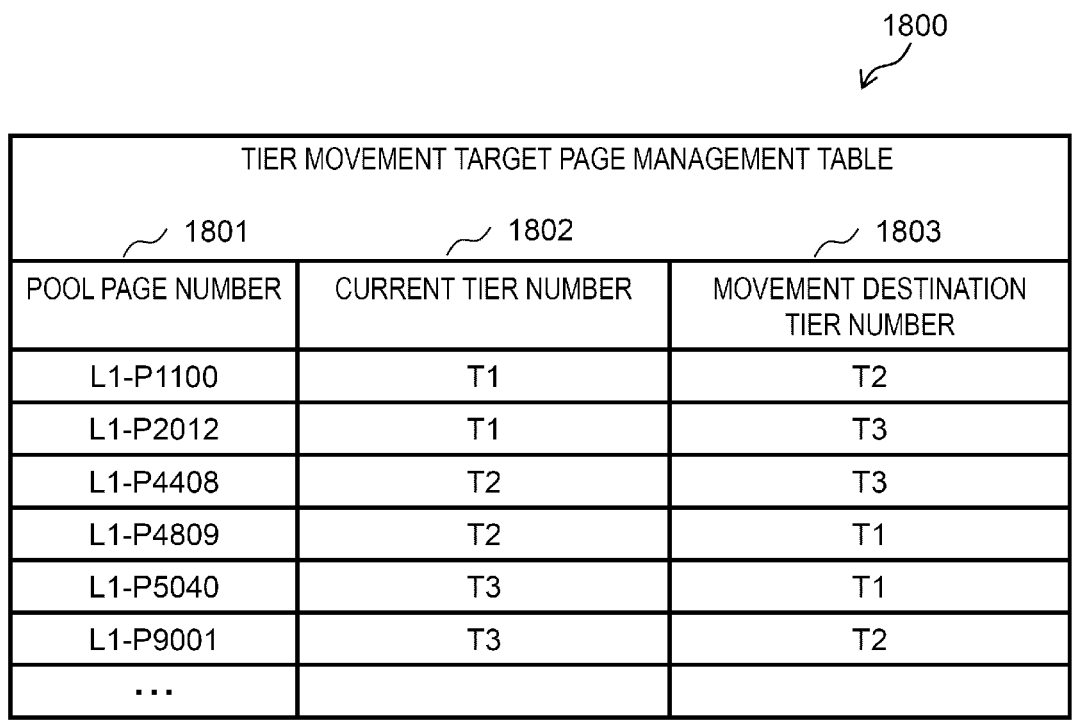
FIG. 15 is a diagram illustrating an example of a tier movement target page management table.

FIG. 15 is a diagram illustrating an example of the tier movement target page management table 1800. In the tier movement target page management table 1800, records are set corresponding to the pool pages designated as a target of the tier movement in the storage pool 102. Each of the records has information on a pool page number 1801, a current tier number 1802, and a movement destination tier number 1803.

The pool page number 1801 is a number for identifying the pool page designated as a tier movement target, and corresponds to the pool page number 1301 in the pool page and volume page management table 1300 illustrated in FIG. 10. The current tier number 1802 and the movement destination tier number 1803 are numbers that represent a current tier and a destination tier of each pool page, respectively, and correspond to the tier number 1403 in the volume page and tier page management table 1400 illustrated in FIG. 11.

When one of the pool pages is designated as the tier movement target in the storage pool 102, the CPU 11 registers a record of the pool page in the tier movement target page management table 1800, and sets the information on the pool page number 1801, the current tier number 1802, and the movement destination tier number 1803. By referring to the information, the pool page can be moved from an original tier to another tier.

The access frequency monitoring program 2100 is a program for monitoring the access frequency of each pool page of the storage pool 102 and updating the performance information table 1200. The size review instruction program 2200 is a program for periodically reviewing sizes of each tier and the buffer in the storage pool 102. The tier size determination program 2300 is a program for determining the size of each tier when tiering the storage pool 102. The buffer size determination program 2400 is a program for determining the buffer size when tiering the storage pool 102. The size change program 2500 is a program for reflecting the sizes of each tier and the buffer reviewed by the size review instruction program 2200. The tier control program 2600 is a program for determining a pool page as the tier movement target in the storage pool 102 and moving a tier of the pool page. The pool management program 2700 is a program for managing the storage pool 102 by adding or deleting volumes in the storage system 10, updating each table accordingly, and the like. The storage service program 2800 is a program for accessing the storage device 17 or the object storage service 221 in response to an access request from the storage client computer 211 and updating the performance information table 1200. The object storage access program 2900 is a program for reading and writing the object storage service 221 in response to an access request from the storage client computer 211 to the object storage service 221 managed by the storage system 10. The buffer page reclamation program 3000 is a program for expelling and releasing, from the third tier buffer 113, a buffer page that is not accessed for a certain period of time. By executing these programs, the CPU 11 can function as a storage management unit that manages the storage pool 102 in a tiered manner.

Figure 16:
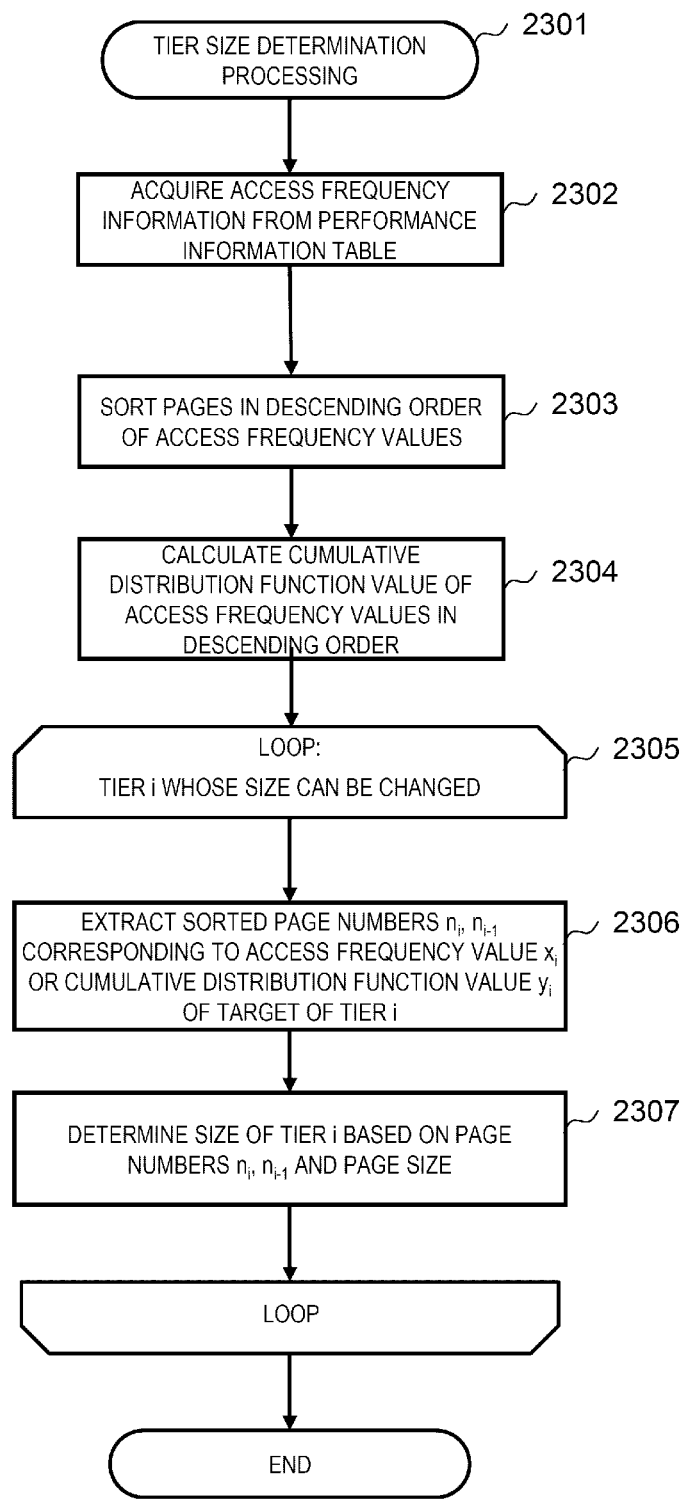
FIG. 16 is a flowchart of tier size determination processing.

FIG. 16 is a flowchart of tier size determination processing 2301 performed by the CPU 11 executing the tier size determination program 2300.

In step 2302, access frequency information of each pool page is acquired from the performance information table 1200. Here, by acquiring the values in the IOPH 1202 (the values in the latest value 1221) set for each record in the performance information table 1200, the access frequency of each pool page can be acquired.

In step 2303, the access frequencies of the pool pages acquired in step 2302 are sorted in a descending order, that is, in an order from the pool page with the highest access frequency. Accordingly, the frequency distribution of the access frequencies of the pool pages as illustrated in the graph 601 of FIG. 7 can be obtained.

In step 2304, the cumulative frequency distribution of the access frequencies of the pool pages sorted in step 2303 is calculated. Accordingly, the cumulative frequency distribution of the access frequencies of the pool pages as illustrated in the graph 602 of FIG. 7 can be obtained.

In step 2305, loop processing for repeating processing of steps 2306 and 2307 is performed for each tier whose size can be changed in the storage pool 102. In the following, the processing of steps 2306 and 2307 will be described with an execution target tier of the loop processing at this time as an i-th tier. That is, when the loop processing is performed on the first tier 111, the second tier 112, and the third tier 114 illustrated in FIGS. 5A and 5B, the processing of steps 2306 and 2307 is performed for each of tiers with i=1 to 3, respectively.

In step 2306, a target access frequency value xi for the i-th tier is acquired in the frequency distribution obtained in step 2303, or a target cumulative frequency value yi for the i-th tier is acquired in the cumulative frequency distribution obtained in step S2304, and sorted page numbers ni and ni−1 corresponding to these values are extracted. Accordingly, the pool pages with page numbers of ni−1+1 to ni are determined as pages to be stored in the i-th tier. In this case, the pages to be stored in each tier are determined such that the pages with higher access frequencies are stored in a higher tier. When i=1, ni−1=n0=0, and when i is a lowest tier number (for example, i=3) in the storage pool 102, ni=N.

In step 2307, a size of the i-th tier is determined based on sizes of the pool pages with the page numbers ni and ni−1 extracted in step 2306 and the sizes of the pool pages of the storage pool 102. Here, as described above, the size of the i-th tier is determined by obtaining a total size of the pool pages (a total number of the pages) with the page numbers ni−1+1 to ni that are determined to be stored in the i-th tier.

After performing the processing of steps 2306 and 2307 on all the tiers, the loop processing of step 2305 is exited, and the tier size determination processing 2301 illustrated in the flowchart of FIG. 16 is ended.

The CPU 11 executes the tier size determination program 2300 to perform the above-described tier size determination processing 2301, so that the CPU 11 can determine the size of each of the plurality of tiers set in the storage pool 102 based on the frequency distribution or the cumulative frequency distribution obtained by aggregating the access frequencies in units of the pages in the storage pool 102.

In the above-described tier size determination processing 2301, the access frequency may be evaluated for each access type (read or write), and the size of each tier may be determined.

Figure 17:
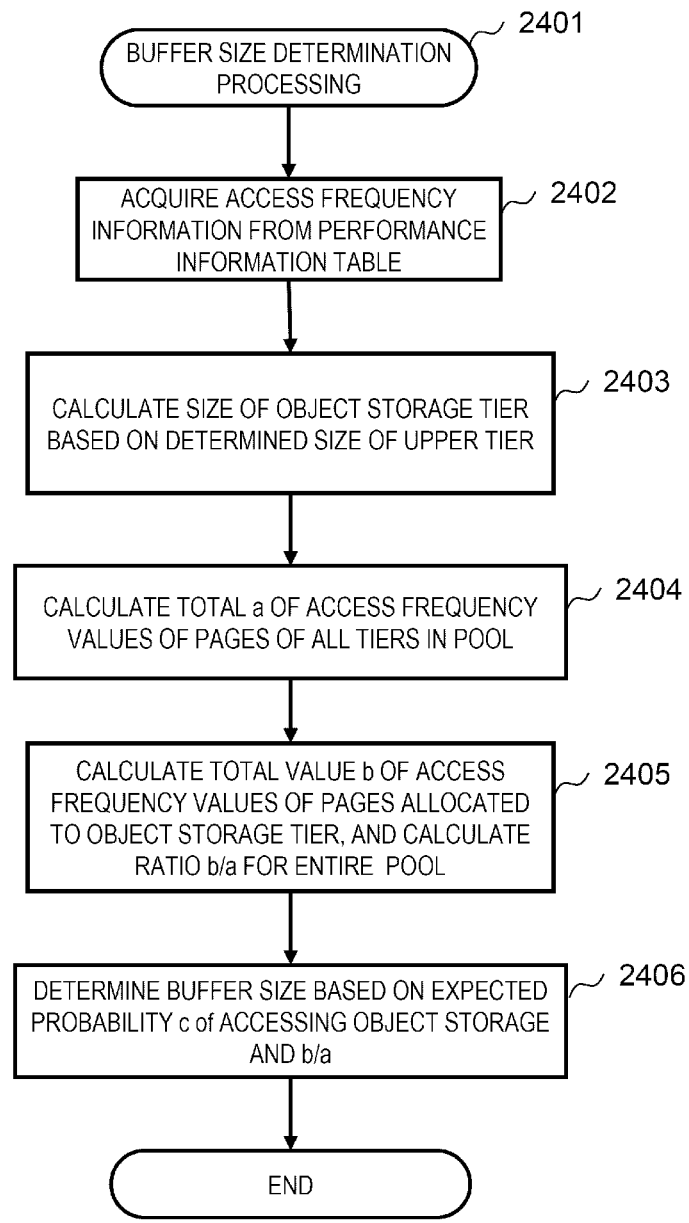
FIG. 17 is a flowchart of buffer size determination processing.

FIG. 17 is a flowchart of buffer size determination processing 2401 performed by the CPU 11 executing the buffer size determination program 2400.

In step 2402, the access frequency information of each pool page is acquired from the performance information table 1200. Here, by acquiring the values in the IOPH 1202 (the values in the latest value 1221) set for each record in the performance information table 1200, the access frequency of each pool page can be acquired.

In step 2403, a size of a buffer target tier, that is, a tier corresponding to the object storage service 221 (hereinafter, referred to as "the object storage tier") is calculated based on the access frequency of each pool page acquired in step 2402. Here, for example, the size of the object storage tier can be calculated based on a size of an upper tier determined by the tier size determination processing 2301 of FIG. 16. Specifically, for example, in the example of FIGS. 5A and 5B, the size of the third tier 114, which is the object storage tier, is calculated based on the sizes of the first tier 111 and the second tier 112, which are the upper tiers. By using the size of the object storage tier determined in the tier size determination processing 2301, the processing of step 2403 may be omitted.

In step 2404, a total a of the access frequency values for all the tiers in the storage pool 102 is calculated by summing the access frequencies of the pool pages acquired in step 2402.

In step 2405, in the access frequencies of the pool pages acquired in step S2402, the access frequencies of the pool pages allocated to the object storage tier (the third tier 114)

are summed to calculate an access frequency b for the object storage tier. By dividing the calculated access frequency b of the object storage tier by the total a of the access frequency values of all the tiers obtained in step 2404, a ratio b/a of the access frequency of the object storage tier to the entire storage pool 102 is calculated.

In step 2406, a size of the buffer area with respect to the object storage tier is determined based on an expected access probability c of the object storage service 221 set in advance and the access frequency ratio b/a obtained in step 2405. Here, for example, assuming that the size of the object storage tier obtained in step 2403 is s, the buffer size k representing the size of the buffer area (the third tier buffer 113) is calculated by the following Formula (1). The expected access probability c is an assumed value of a probability that the access request to the object storage tier from the storage client computer 211 is made, and can be determined based on a simulation result in advance and a past statistical value of a similar system.

$$k = s \times c \times b/a \quad \text{(Formula 1)}$$

After determining the buffer size k in step 2406, the buffer size determination processing 2401 illustrated in the flowchart of FIG. 17 is ended.

The CPU 11 executes the buffer size determination program 2400 to perform the above-described buffer size determination processing 2401, so that the CPU 11 can determine the size k of the third tier buffer 113 which is the buffer area based on the total b of the access frequencies of the pages of the object storage tier which is the buffer target tier and the expected access probability c of the object storage service 221 corresponding to the object storage tier.

Figure 18:
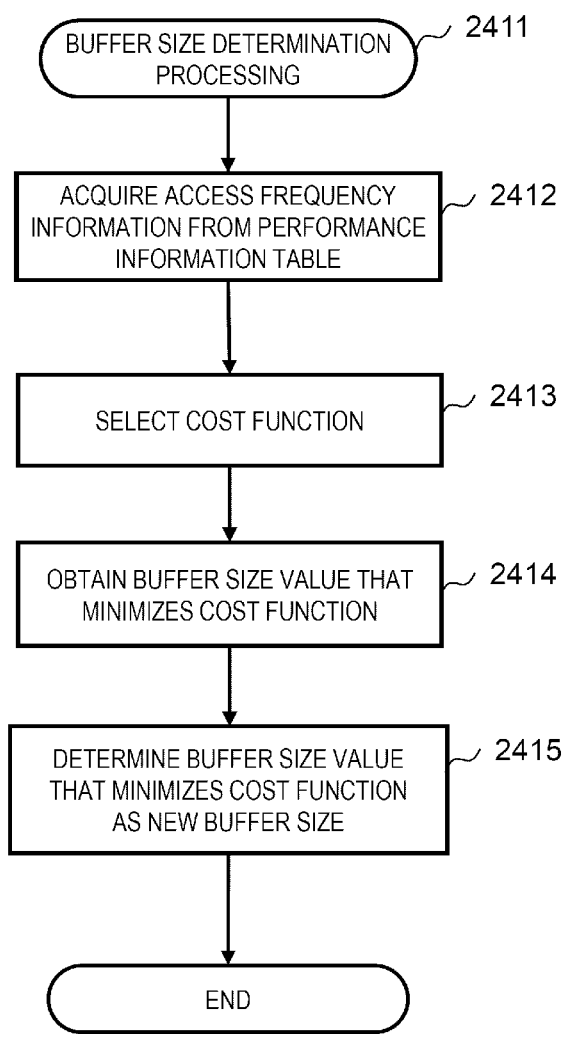
FIG. 18 is a flowchart of buffer size determination processing.

Alternatively, the size of the buffer area may be determined by buffer size determination processing 2411 different from the buffer size determination processing 2401 described above. FIG. 18 is a flowchart of the buffer size determination processing 2411 performed by the CPU 11 executing the buffer size determination program 2400.

In step 2412, similar to step 2402 in FIG. 17, the access frequency information of the pool pages is acquired from the performance information table 1200.

In step 2413, a cost function for the storage pool 102 is selected. Here, the selected cost function is a function representing an access cost of an entire tier when the storage pool 102 is tiered, and is expressed by, for example, the following Formula (2).

$$c_{all}(k) = \sum_{i=1}^{T} c_i(k, n_i) \quad \text{(Formula 2)}$$

In Formula (2), Ci(k, ni) represents the cost function for the i-th tier. A T-th tier is a storage tier provided by the object storage service 221, and in the examples of FIGS. 5A and 5B, the third tier 114 corresponds to the T-th tier (T=3). That is, the cost function calculated by Formula (2) is a total of the cost functions of all the tiers.

Here, a cost function of the T-th tier provided by the object storage service 221 is represented by the following Formula (3).

$$CT(k,nT) = B(k,nT) + O(k,nT) \quad \text{(Formula 3)}$$

In Formula (3), B(k, nT) represents a cost function of the buffer area, that is, the third tier buffer 113 with respect to the object storage service 221. O(k,nT) is a cost function of pages outside the buffer area (the third tier buffer 113), and is obtained by the following Formula (4).

$$O(k,nT) = U \times P(k,nT) \times Q(k,nT) \quad \text{(Formula 4)}$$

In Formula (4), U represents a penalty value for accessing the object storage service 221. P(k, nT) represents a probability of accessing the object storage tier, and Q(k, nT) represents a probability that a page in the buffer area is rewritten when accessing the object storage tier. These probabilities are calculated by the following Formulas (5) and (6), respectively.

$$P(k, n_T) \cong \frac{\sum_{j=1}^{n_T} x_{Tj}}{\sum_{i=1}^{T} \sum_{j=1}^{n_i} x_{ij}} \cong \frac{\sum_{j=1}^{n_T} x_{Tj}}{n_T} \quad \text{(Formula 5)}$$

$$Q(k, n_T) \cong \frac{\sum_{j=k}^{n_T} x_{Tj}}{\sum_{j=1}^{n_T} x_{Tj}} \cong \frac{n_T - k}{n_T} \quad \text{(Formula 6)}$$

In Formulas (5) and (6), xij represents an access frequency of a j-th page of the i-th tier. When i=T, xTj represents an access frequency of a j-th page of the T-th tier, that is, the object storage tier. In addition, nT represents a total number of pages of the T-th tier, that is, the object storage tier, and k represents the buffer size, that is, a total number of pages in the buffer area. That is, the cost function Call(k) of the storage pool 102 represented by the above-described Formula (2) is calculated based on the access frequency of each tier of the storage pool 102.

In step 2414, a buffer size value that minimizes the cost function, selected in step 2413, of the storage pool 102 is obtained. Here, the buffer size value is determined by obtaining a value of k which minimizes the value of the cost function expressed by the above-described Formula (2).

In step 2415, the value of k obtained in step 2414, that is, the buffer size that minimizes the cost function of the storage pool 102, is determined as the size of the buffer area with respect to the object storage tier.

After determining the size k of the buffer size area in step 2415, the buffer size determination processing 2411 illustrated in the flowchart of FIG. 18 is ended.

The CPU 11 executes the buffer size determination program 2400 to perform the above-described buffer size determination processing 2411, so that the CPU 11 can determine the size k of the third tier buffer 113 based on the cost function Call(k) which represents the access cost based on the access frequency of each tier of the storage pool 102, and a change of the cost function Call(k) when the size of the third tier buffer 113, which is the buffer area, is changed.

In the above-described buffer size determination processing 2401 and 2411, the access frequency may be evaluated for each access type (read or write) to determine the size of the buffer area.

Figure 19:
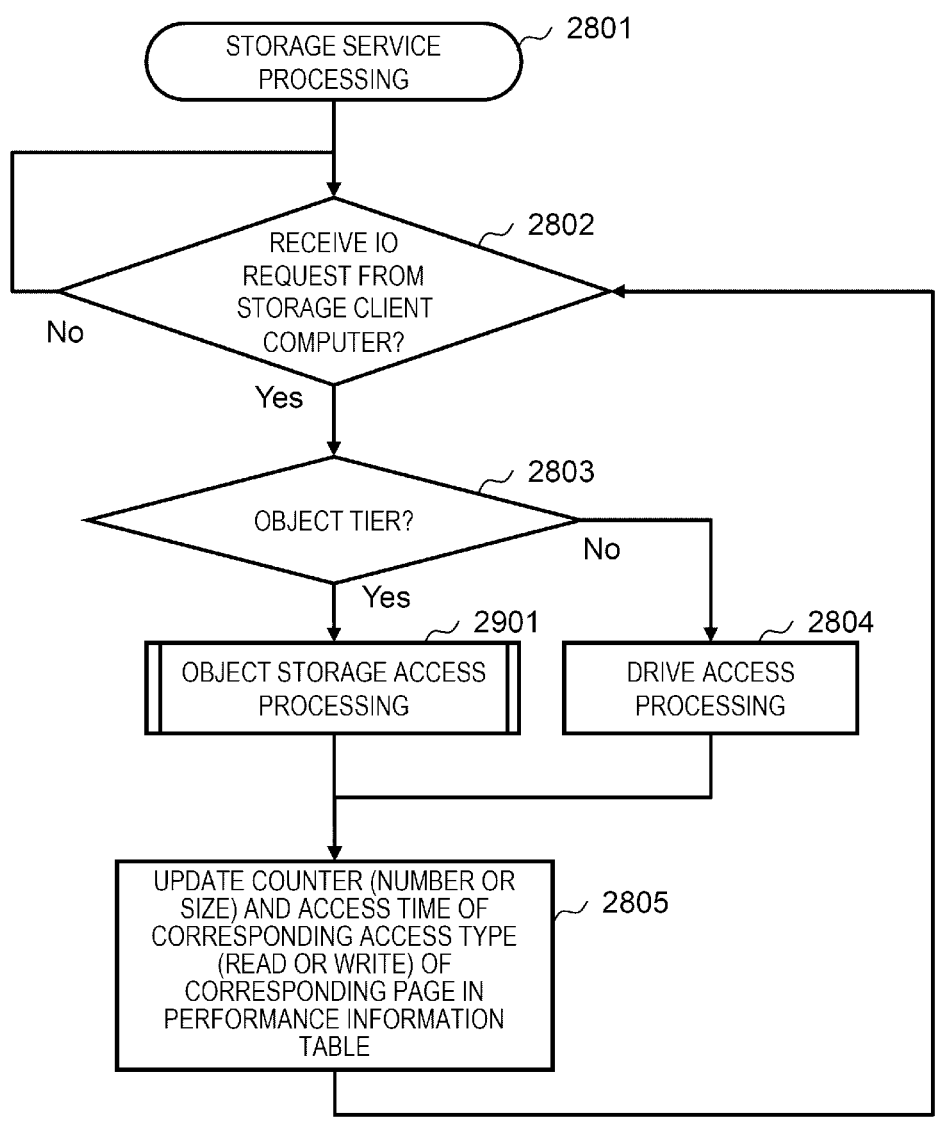
FIG. 19 is a flowchart of storage service processing.

FIG. 19 is a flowchart of storage service processing 2801 performed by the CPU 11 executing the storage service program 2800.

In step 2802, it is determined whether an IO request as an access request to the virtual volume 103 is received from the storage client computer 211. The CPU 11 waits in step 2802 until the IO request is received, and then the processing proceeds to step 2803 in response to receiving the IO request.

In step 2803, by referring to the volume page and tier page management table 1400, whether the IO request received in step 2802 is for the page of the object storage tier is determined. As a result, if the IO request is for the page of the object storage tier, the processing proceeds to step 2901, and if the IO request is for a page in another tier, the processing proceeds to step 2804.

In step 2901, object storage access processing is executed as access processing for the page of the object storage tier. Details of the object storage access processing will be described later with reference to FIG. 20.

In step 2804, drive access processing is executed as access processing for a page in a tier other than the object storage tier. Here, the drive access processing is executed by designating a volume page corresponding to the received IO request from the volume pages of the plurality of drives 101 of the storage device 17 and reading and writing data from and to the volume page.

After executing the processing of step 2901 or step 2804, in step 2805, these processing results are reflected and the performance information table 1200 is updated. Here, for example, in the performance information table 1200 of FIG. 9, the values of the counters 1222 and 1232 of the corresponding access type (read or write) of the corresponding page are updated, and the access time 1204 is updated.

After updating the performance information table 1200 in step 2805, the processing returns to step 2802 and the CPU 11 waits until a next IO request is received.

The CPU 11 executes the storage service program 2800 to perform the above-described storage service processing 2801, so that the CPU 11 can access the corresponding page of the storage device 17 or the object storage service 221 in response to the access request from the storage client computer 211.

Figure 20:
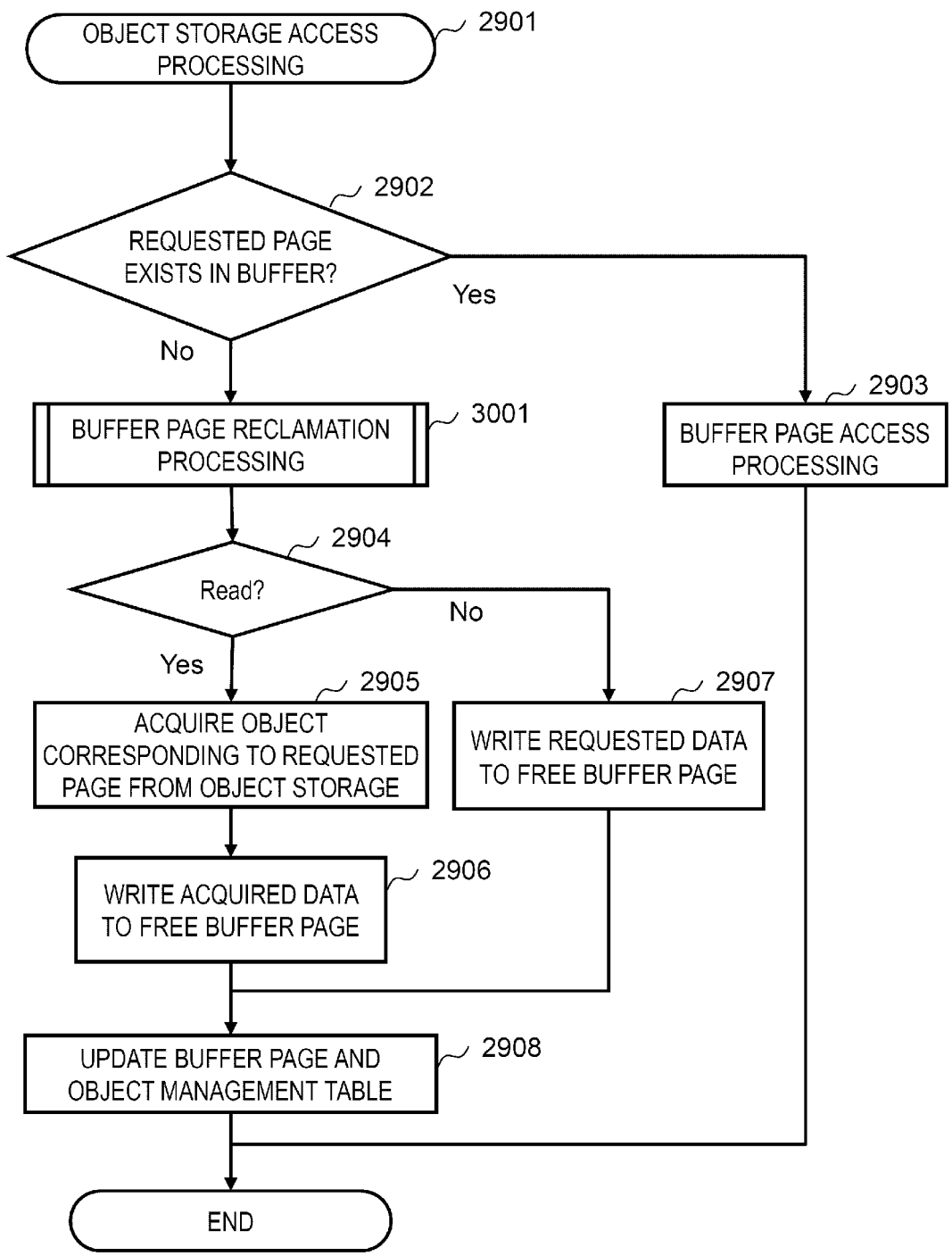
FIG. 20 is a flowchart of object storage access processing.

FIG. 20 is a flowchart of object storage access processing 2901 performed by the CPU 11 executing the object storage access program 2900. The object storage access processing 2901 is called and executed in step 2901 in the storage service processing 2801 in FIG. 19.

In step 2902, by referring to the buffer page and object management table 1700, it is determined whether the page corresponding to the IO request received in step 2802 of FIG. 19 exists as a buffer page in the buffer area (the third tier buffer 113). As a result, if the corresponding page exists as the buffer page, the processing proceeds to step 2903, and if the corresponding page does not exist, the processing proceeds to step 3001.

In step 2903, the access processing is performed on the buffer page corresponding to the IO request. After executing the processing of step 2903, the object storage access processing 2901 illustrated in the flowchart of FIG. 20 is ended.

In step 3001, buffer page reclamation processing is executed as processing for expelling a buffer page that is not accessed for a certain period of time from the third tier buffer 113 and releasing the buffer page. Details of the buffer page reclamation processing will be described later with reference to FIG. 21.

In step 2904, it is determined whether the IO request is a read request. As a result, if the IO request is a read request, the processing proceeds to step 2905, and if the IO request is not a read request, that is, if the IO request is a write request, the processing proceeds to step 2907.

In step 2905, by referring to the tier page and object management table 1600, an object corresponding to a page subjected to the read request is obtained from the object storage provided by the object storage service 221. Subsequently, in step 2906, data of the object acquired in step 2905 is written to an free buffer page in the buffer area.

In step 2907, the data subjected to the write request is written to an free buffer page in the buffer area. The data stored in the buffer area (the third tier buffer 113) in step 2907 is subsequently stored in the object storage (the third tier 114) at an appropriate timing by the processing of the CPU 11.

After executing the processing of step 2906 or step 2907, in step 2908, these processing results are reflected and the buffer page and object management table 1700 is updated.

After executing the processing of step 2908, the object storage access processing 2901 illustrated in the flowchart of FIG. 20 is ended.

The CPU 11 executes the object storage access program 2900 to perform the above-described object storage access processing 2901, so that the CPU 11 can access the object storage service 221 via the buffer page in response to the access request from the storage client computer 211.

Figure 21:
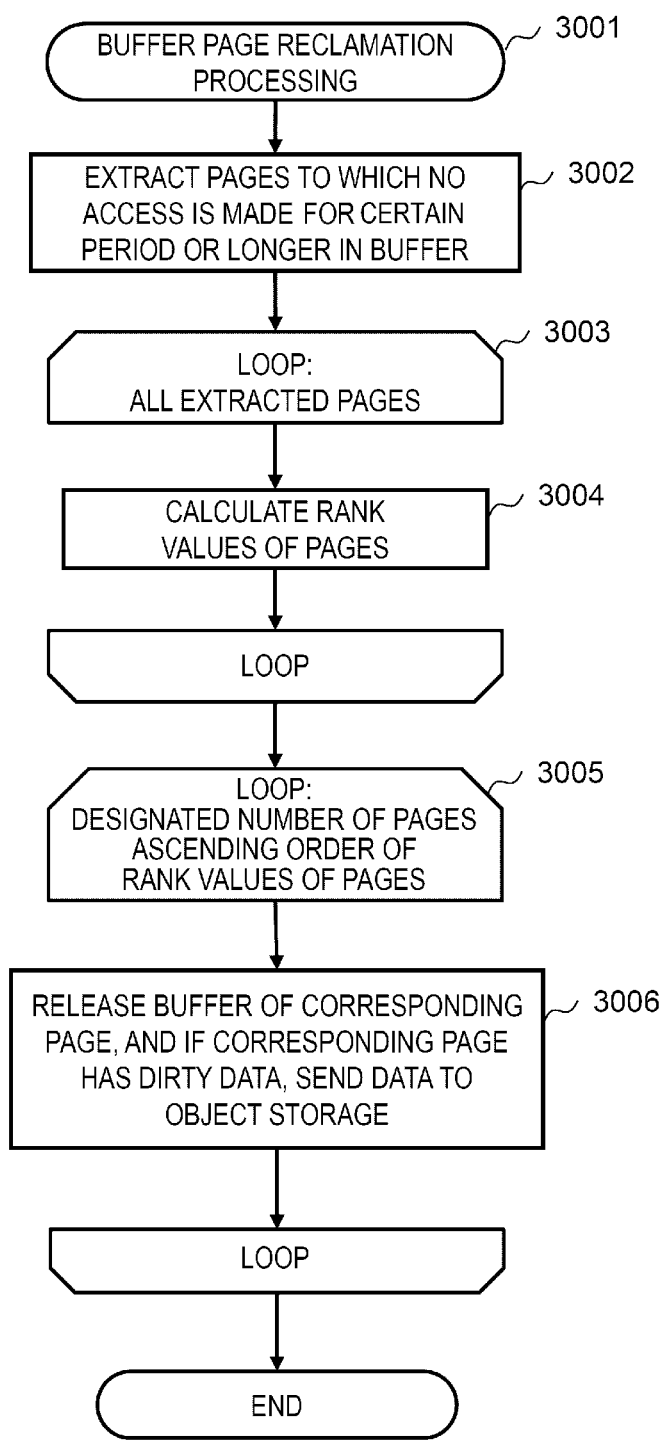
FIG. 21 is a flowchart of buffer page reclamation processing.

FIG. 21 is a flowchart of buffer page reclamation processing 3001 performed by the CPU 11 executing the buffer page reclamation program 3000. The buffer page reclamation processing 3001 is called and executed in step 3001 in the object storage access processing 2901 of FIG. 20.

In step 3002, by referring to the performance information table 1200, buffer pages that are not accessed for a certain period of time (for example, 1 hour) or longer in the buffer area (the third tier buffer 113) are extracted.

In step 3003, loop processing for repeating processing of step 3004 for each buffer page extracted in step 3002 is performed.

In step 3004, rank values of the buffer pages as the processing target are calculated. Here, for example, a rank value $Rj$ of a j-th buffer page is calculated by the following Formula (7).

$$Rj = wp \times wij + rp \times rij \qquad \text{(Formula 7)}$$

In Formula (7), wp represents a penalty coefficient at the time of writing, and a total value of response times of the object storage service 221 to, for example, "PUT" and "GET" instructions, a predetermined constant, and the like are set. In addition, rp represents a penalty coefficient at the time of reading, and the response times of the object storage service 221 to, for example, the "GET" instruction, a predetermined constant, and the like are set. Then, wij and rij represent access frequencies of write and read to the j-th buffer page, respectively.

After performing processing of step 3004 on all the buffer pages, the loop processing of step 3003 is exited and the processing proceeds to step 3005.

In step 3005, loop processing is performed for repeating processing of step 3006 for the number of pages designated in advance in an order from the page with the lowest rank value calculated in step 3004.

In step 3006, the data stored in the buffer page which is the processing target in the buffer area is erased and then the buffer corresponding to this buffer page is released. In this case, if dirty data (data that has not yet been written to the object storage) exists in the corresponding buffer page, the buffer is released after sending the data to the object storage service 221.

After performing the processing of step 3006 for each buffer page with the number of pages designated in advance in an ascending order from the page with the lowest rank value, the loop processing of step 3005 is exited, and the buffer page reclamation processing 3001 illustrated in the flowchart of FIG. 21 is ended.

The CPU 11 executes the buffer page reclamation program 3000 to perform the above-described buffer page reclamation processing 3001, so that the CPU 11 can extract a plurality of pages that are not accessed for a certain period of time in the third tier buffer 113, which is a buffer area, calculate rank values based on the access frequencies of the extracted pages, and release the pages from the top to a predetermined number when the rank values are arranged in the ascending order. That is, the predetermined number of pages can be released based on the access frequencies to the data of the extracted pages.

Figure 22:
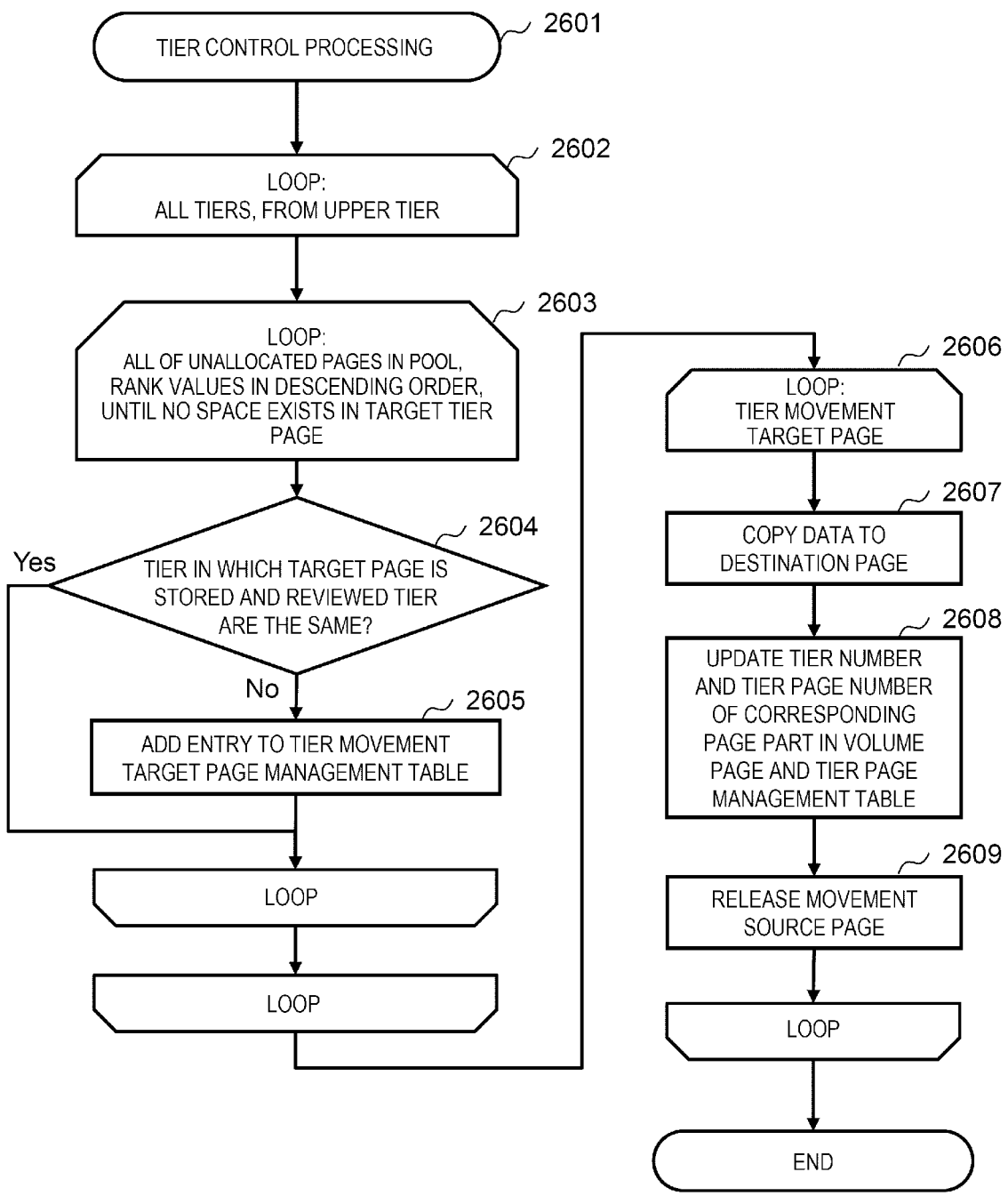
FIG. 22 is a flowchart of tier control processing.

FIG. 22 is a flowchart of tier control processing 2601 performed by the CPU 11 executing the tier control program 2600. The processing is performed, for example, when the tier size determination processing 2301 illustrated in FIG. 16 is executed to determine the size of each tier in the storage pool 102, and then pages corresponding to the size are allocated to each tier, or when the tier is reviewed according to the access frequencies of the pages at an optional timing.

In step 2602, loop processing for repeating the processing of steps 2603 to 2605 is performed in an order from the upper tier of all the tiers set in the storage pool 102. For example, in the case of the tier structure of the storage pool 102 illustrated in FIGS. 5A and 5B, the loop processing of step 2602 is performed in an order of the first tier 111, the second tier 112, and the third tier 114.

In step 2603, loop processing for repeating the processing of steps 2604 and 2605 is performed on all the pool pages that are not allocated to the tier in the storage pool 102 and the pool pages that are designated as tier review targets, in an order from the pool page with the highest rank value obtained by the above Formula (7) until no space exists in a size of a processing target tier.

In step 2604, the processing target tier is set as a reviewed tier, and it is determined whether the tier in which a processing target page is currently stored is the same as the reviewed tier. As a result, if the tiers are not the same, the processing proceeds to step 2605, and if they are the same, the processing of step 2605 is not executed and the processing proceeds to next loop processing. If the processing target page has not been allocated to any tier yet, negative determination is made in step 2604 and the processing may proceed to step 2605.

In step 2605, an entry is added to the tier movement target page management table 1800. Here, in the tier movement target page management table 1800 illustrated in FIG. 15, a record corresponding to the processing target page is added, and information of the pool page number 1801, the current tier number 1802, and the movement destination tier number 1803 is set for the record, and then the entry corresponding to the processing target page is added.

After performing the processing of steps 2604 and 2605 on all the tiers of the storage pool 102 for each free page, the loop processing of step 2602 is exited and the processing proceeds to step 2606.

In step 2606, by referring to the tier movement target page management table 1800, loop processing for repeating the processing of steps 2607 to 2609 is performed on all the tier target movement pages recorded here.

In step 2607, data currently stored in the processing target page is copied to a destination page.

In step 2608, the volume page and tier page management table 1400 is updated. Here, in the volume page and tier page management table 1400, the values of the tier number 1403 and the tier page number 1404 are updated in the record corresponding to the processing target page.

In step 2609, data stored in a movement source page is deleted and the page is released.

After performing the processing of steps 2607 to 2609 on all the tier target movement pages, the loop processing of step 2606 is exited, and the tier control processing 2601 illustrated in the flowchart of FIG. 22 is ended.

The CPU 11 executes the tier control program 2600 to perform the above-described tier control processing 2601, so that the CPU 11 can allocate pages to each tier of the storage pool 102 according to the size. That is, the pages to be stored in each tier can be determined based on the access frequencies of the pages of the storage pool 102, and the size of each tier can be determined based on a total size of the pages determined to be stored.

Figure 23:
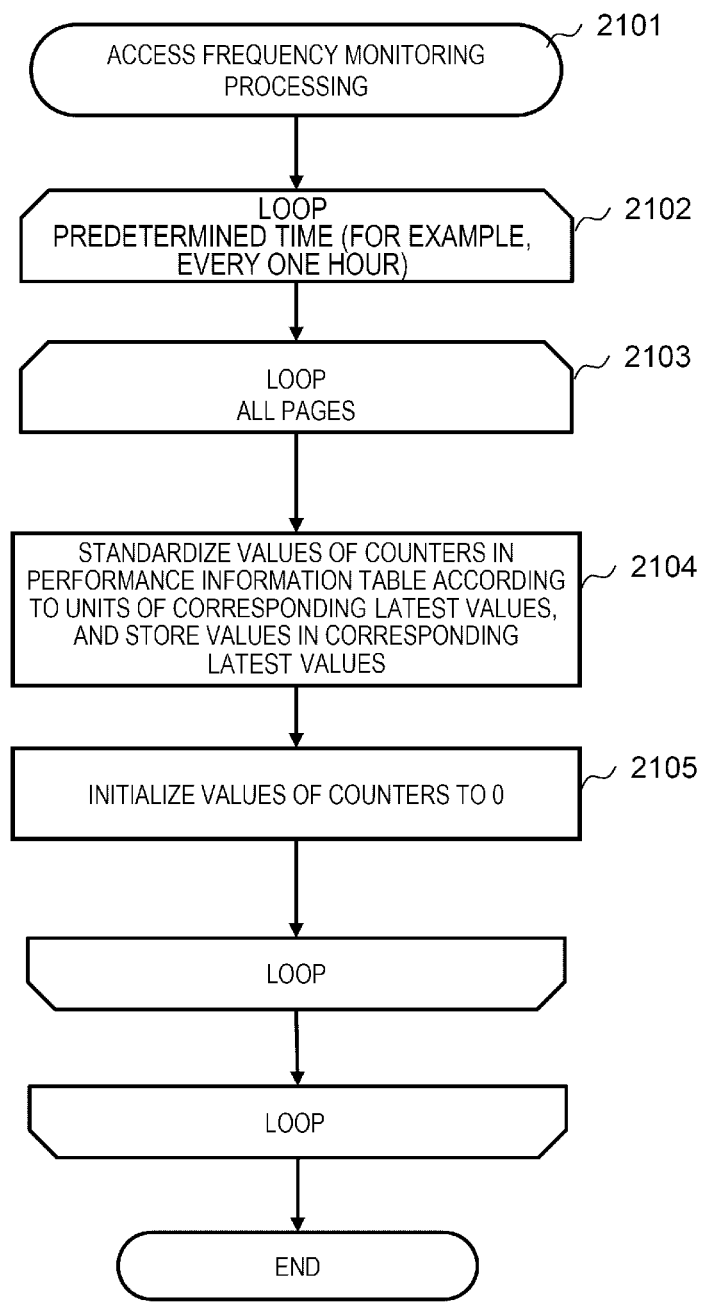
FIG. 23 is a flowchart of access frequency monitoring processing.

FIG. 23 is a flowchart of access frequency monitoring processing 2101 performed by the CPU 11 executing the access frequency monitoring program 2100.

In step 2102, loop processing for repeating processing of steps 2103 to 2105 is performed for every predetermined time (for example, 1 hour).

In step 2103, loop processing for repeating the processing of steps 2104 and 2105 is performed on all the pages of the storage pool 102.

In step 2104, the values of the counters 1222 and 1232 corresponding to the processing target page in the performance information table 1200 are standardized according to units of the corresponding latest values 1221 and 1231, respectively, and the standardized values are stored in the latest values 1221 and 1231, respectively. Accordingly, aggregated values of the counters 1222 and 1232 obtained within a certain period of time are reflected in the latest values 1221 and 1231, respectively.

In step 2105, the values of the counters 1222 and 1232 reflected in the latest values 1221 and 1231 in step 2104 are initialized to 0, respectively.

After the processing of steps 2104 and 2105 is performed on all the pages of the storage pool 102, the loop processing of step 2103 is exited, and the access frequency monitoring processing 2101 illustrated in the flowchart of FIG. 23 is ended.

The CPU 11 executes the access frequency monitoring program 2100 to perform the above-described access frequency monitoring processing 2101, so that the CPU 11 can reset the performance information table 1200 for every predetermined time.

Figure 24:
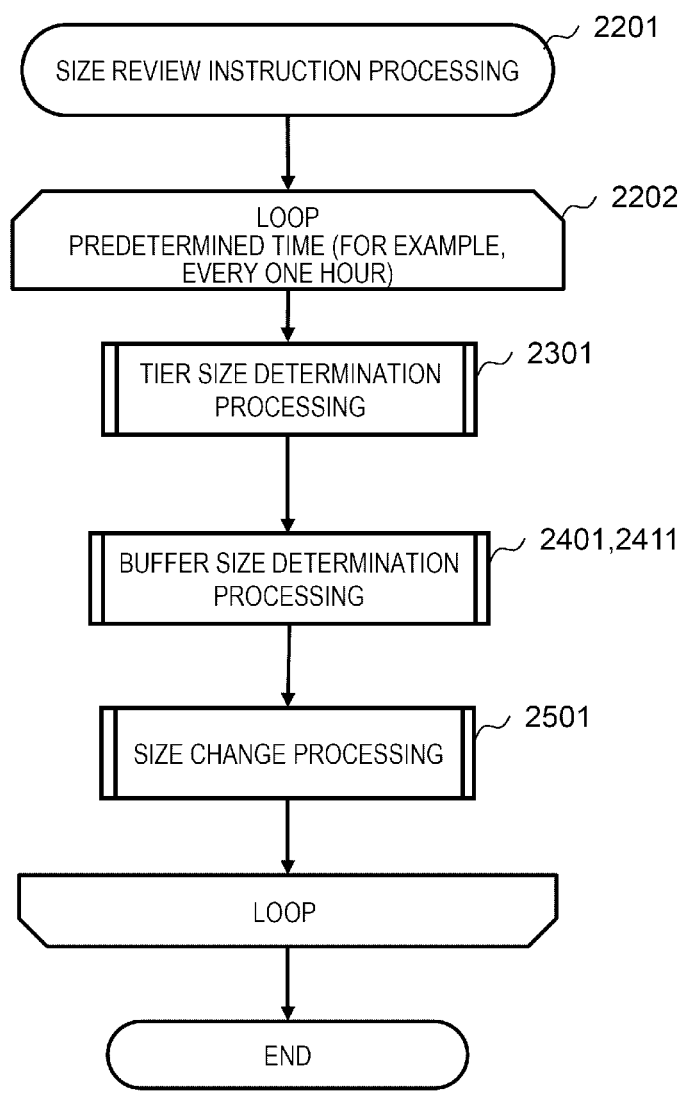
FIG. 24 is a flowchart of size review instruction processing.

FIG. 24 is a flowchart of size review instruction processing 2201 performed by the CPU 11 executing the size review instruction program 2200.

In step 2202, loop processing is performed for every predetermined time (for example, 1 hour) respectively. In the loop processing, the tier size determination processing 2301 described with reference to FIG. 16 and one of the buffer size determination processing 2401 and 2411 described in FIGS. 17 and 18, respectively, are performed respectively, and size change processing 2501 is performed. Details of the size change processing 2501 will be described later with reference to FIG. 25.

The CPU 11 executes the size review instruction program 2200 and performs the above-described size review instruction processing 2201, so that the CPU 11 can review the tier size and buffer size for every predetermined time.

Figure 25:
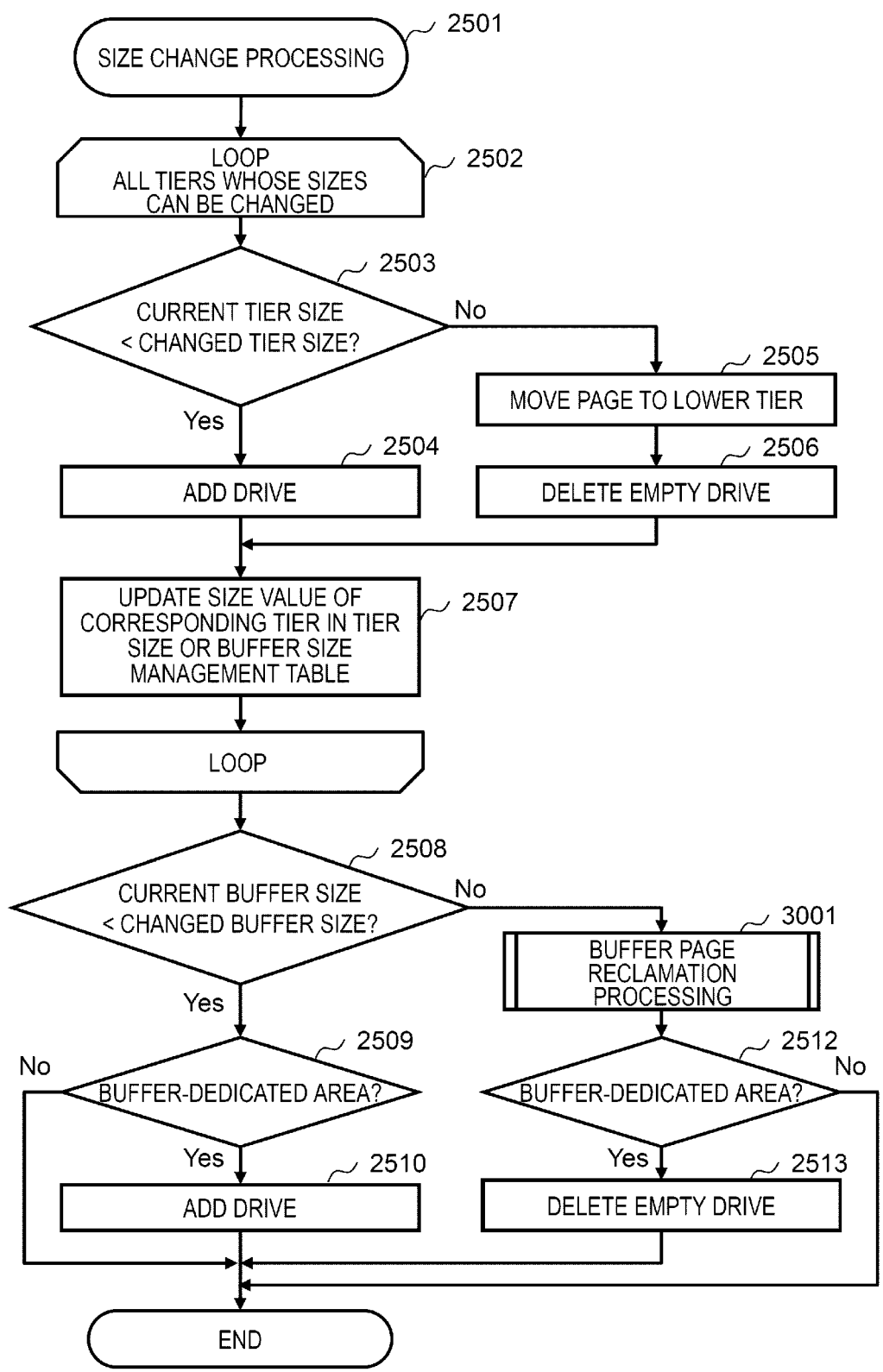
FIG. 25 is a flowchart of size change processing.

FIG. 25 is a flowchart of the size change processing 2501 performed by the CPU 11 executing the size change program 2500. The size change processing 2501 is called and executed in step 2501 in the size review instruction processing 2201 in FIG. 24.

In step 2502, loop processing for repeating the processing of steps 2503 to 2507 is performed on all the tiers whose sizes can be changed in the storage pool 102.

In step 2503, a current size of the processing target tier is compared with a changed size, that is, the size determined by the tier size determination processing 2301 executed in the size review instruction processing 2201 of FIG. 24. As a result, if the changed size is larger than the current size, the processing proceeds to step 2504, and if not, that is, if the current size is equal to or larger than the changed size, the processing proceeds to step 2505.

In step 2504, a drive is added to the processing target tier. Here, in the storage device 17 or the object storage service 221, by adding the drive for storing the data of the tier, a storage capacity for compensating for a difference between the current size and the changed size is expanded.

In step 2505, some of the pages in the processing target tier are moved to a lower tier. Here, for example, the pages are moved to the lower tier by the number of pages according to the difference between the current size and the changed size, in the order from the page with the lowest rank value obtained by the above-described Formula (7).

In step 2506, the drive which is empty due to the page movement in step 2505 is deleted from the storage pool 102.

After executing step 2504 or step 2506, in step 2507, these processing results are reflected and the tier size or buffer size management table 1500 is updated. Here, in the tier size or buffer size management table 1500, the value in the size 1502 of the record corresponding to the processing target tier is updated.

After performing the processing of steps 2503 to 2507 on all the tiers whose sizes can be changed, the loop processing of step 2502 is exited and the processing proceeds to step 2508.

In step 2508, a current size of the buffer area (the third tier buffer 113) is compared with a changed size, that is, the size determined by the buffer size determination processing 2401 or 2411 executed in the size review instruction processing 2201 of FIG. 24. As a result, if the changed size is equal to or larger than the current size, the processing proceeds to step 2509, and if not, that is, if the current size is larger than the changed size, the processing proceeds to step 3001.

In step 2509, it is determined whether the buffer area is provided as a dedicated area in the storage pool 102. As in the example of the tier structure illustrated in FIG. 5A, when the tier located on an upper side of the object storage tier and the buffer area used for reading and writing data in the object storage tier are provided separately, the processing proceeds to step 2510. If this is not the case, that is, as in the example of the tier structure illustrated in FIG. 5B, when a part of the tier located on the upper side of the object storage tier also serves as the buffer area of the object storage tier, the size change processing 2501 illustrated in the flowchart of FIG. 25 is ended without executing the processing of step 2510.

In step 2510, a drive is added to the buffer area. Here, in the storage device 17, by adding the drive for storing the buffer data for the object storage service 221, a storage capacity for compensating for a difference between the current buffer size and the changed buffer size is expanded. Then, the size change processing 2501 illustrated in the flowchart of FIG. 25 is ended.

In step 3001, by performing the buffer page reclamation processing described with reference to FIG. 21, the buffer pages that are not accessed for the certain period of time are expelled from the buffer area and released as described above.

In step 2512, as in step 2509, it is determined whether the buffer area is provided as the dedicated area in the storage pool 102. If the storage pool 102 has the buffer-dedicated area, the processing proceeds to step 2513, and if not, the size change processing 2501 illustrated in the flowchart of FIG. 25 is ended without executing the processing of step 2513.

In step 2513, the drive which is empty due to the buffer page reclamation processing in step 3001 is deleted from the storage pool 102. Then, the size change processing 2501 illustrated in the flowchart of FIG. 25 is ended.

The CPU 11 executes the size change program 2500 to perform the above-described size change processing 2501 in the size review instruction processing 2201 in FIG. 24, so that the CPU 11 can dynamically change the size of each tier or buffer area set in the storage pool 102 during the operation of the storage pool 102.

According to the embodiment of the invention described above, the following effects are exerted.

(1) The storage system 10 includes the CPU 11 that operates the storage management unit configured to manage the storage pool 102 in the tiered manner, the storage device 17 that stores data, and the storage pool 102 with a plurality of types of the storages including at least the storage device 17. The storage management unit (the CPU 11) tiers the storing area of the storage pool 102 into the first tier 111, the second tier 112, and the third tier 114, allocates the tiers to the storages (the high-speed drives 101*a*, the low-speed drives 101*b*, and the object storage service 221) having the different access performances, and determines the tier for storing the data from the first tier 111, the second tier 112, and the third tier 114 based on the data access frequency. The third tier buffer 113 as the buffer area for temporarily storing the data stored in the third tier 114, which is the buffer target tier, is provided in the storage pool 102, and the third tier buffer 113 is allocated to the storage (the low-speed drive 101*b*) having the higher access performance than the storage (the object storage service 221) to which the third tier 114 is allocated. Further, the storage management unit (the CPU 11) determines the size of the third tier buffer 113 based on the access frequency of the third tier 114 by the buffer size determination processing 2401 and 2411. Accordingly, the appropriate buffer area can be set in the storage system 10 that performs the hierarchical storage management.

(2) The tiers set in the storage pool 102 include the upper second tier 112 allocated to the storage (the low-speed drives 101*b*) having the higher access performance than the third tier 114, which is the buffer target tier. The third tier buffer 113 and the second tier 112 are allocated to the same storage (the low-speed drives 101*b*). Accordingly, the third tier buffer 113 as the buffer area of the third tier 114 can be provided in the storage pool 102 without separately preparing the storage for the buffer area.

(3) The storage management unit (the CPU 11) can determine the buffer size k representing the size of the third tier buffer 113 (step 2406) based on the size s of the third tier 114, the access frequency b of the third tier 114, and the expected access probability c of the third tier 114. Accordingly, the buffer size k can be determined to an appropriate value.

(4) The storage management unit (the CPU 11) can calculate the cost function Call(k) that represents the access cost based on the access frequency of each tier of the storage pool 102 (step 2413), and determine the buffer size k based on the calculated cost function Call(k) and the change in the cost function Call(k) when the size of the third tier buffer 113 is changed (steps 2414 and 2415). Also in this way, the buffer size k can be determined to an appropriate value.

(5) The storage management unit (the CPU 11) dynamically changes the size of the third tier buffer 113 during the operation of the storage pool 102 by the size change processing 2501 (steps 2508 to 2513). Accordingly, the size of the third tier buffer 113 can always be kept in an optimum state even during the operation of the storage pool 102.

(6) The storage management unit (the CPU 11) determines the pages to be stored in the tiers of the first tier 111, the second tier 112, and the third tier 114 based on the access frequencies of the pages of the storage pool 102 by the tier size determination processing 2301 (step 2306). That is, the pages to be stored in the tiers are determined such that the pages with the higher access frequencies are stored in the higher tier. The size of each tier is determined based on the total size of the pages determined to be stored. Specifically, the sizes of the first tier 111, the second tier 112, and the third tier 114 are determined based on the frequency distribution or the cumulative frequency distribution obtained by aggregating the access frequencies in the units of the pages of the storage pool 102 (steps 2306 and 2307). Accordingly, the size of each tier and the pages to be stored in each tier can be appropriately determined according to the access frequencies of the pages.

(7) The storage for constructing the storage pool 102 includes an object storage connected to the storage system 10 via a network. The storage management unit (the CPU 11) allocates the third tier buffer 113, which is a buffer area, to the storage device 17 of the storage system 10, and allocates the third tier 114, which is the buffer target tier, to the object storage. The object storage service 221 which is a storage service provided from the outside can be used as the object storage to be allocated to the third tier 114. Accordingly, in the storage system 10 including the object storage, the tiered structure having the buffer area can be implemented.

(8) As illustrated in FIG. 5B, for example, the CPU 11 can use a part of the second tier 112, which is the upper tier of the third tier 114, as the third tier buffer 113. Accordingly, the storage capacity of the storage pool 102 can be efficiently used.

(9) The CPU 11 dynamically changes the sizes of the second tier 112 and the third tier buffer 113 during the operation of the storage pool 102 by the size change processing 2501 (steps 2502 to 2513). Accordingly, the sizes of the second tier 112 and the third tier buffer 113 can always be kept in the optimum state even during the operation of the storage pool 102.

(10) The CPU 11 stores data accessed in the data of the third tier 114 in the third tier buffer 113 and the third tier 114, respectively, by the object storage access processing 2901 (step 2907). The buffer page reclamation processing 3001 releases pages whose data is not accessed in the third tier buffer 113 for a certain period of time or longer. Specifically, the plurality of pages that are not accessed for the certain period of time or longer in the third tier buffer 113 are extracted (step 3002). The rank values based on the access frequencies of the extracted pages are calculated (step 3004), and when the rank values are arranged in the ascending order, the pages are released from the page with the highest rank value to the predetermined number (steps 3005 to 3006). Accordingly, the predetermined number of pages are released based on frequencies of accessing the data of the extracted pages. Accordingly, the third tier buffer 113 can be used efficiently.

The invention is not limited to the above embodiment, and can be implemented by using any component within a range not departing from the gist of the invention. For example, each processing described with reference to FIGS. 16 to 25 may be implemented by hardware such as a field-programmable gate array (FPGA) instead of the CPU 11.

The embodiments and various modifications described above are merely examples, and the invention is not limited to these contents as long as the features of the invention are not impaired. Although various embodiments and modifications are described above, the invention is not limited to these contents. Other embodiments that are regarded within the scope of the technical idea of the invention are also included within the scope of the invention.

What is claimed is:

1. A storage system comprising:
a processor configured to operate a storage management unit;
a storage device configured to store data; and
a storage pool with a plurality of types of storages including at least the storage device, wherein
the storage management unit is configured to:
tier a storing area of the storage pool into a plurality of tiers, and allocate the tiers to the storages having different access performances,
determine, from the plurality of tiers, a tier for storing data based on an access frequency of the data,
provide, in the storage pool, a buffer area for temporarily storing data stored in a buffer target tier, which is at least one of the plurality of tiers, and allocate the buffer area to a storage having a higher access performance than a storage to which the buffer target tier is allocated, and
determine a size of the buffer area based on an access frequency of the buffer target tier.

2. The storage system according to claim 1, wherein
the plurality of tiers include an upper tier allocated to a storage having a higher access performance than the buffer target tier, and
the buffer area and the upper tier are allocated to the same storage.

3. The storage system according to claim 2, wherein
the storage management unit determines the size of the buffer area based on a size of the buffer target tier, the access frequency of the buffer target tier, and an expected access probability of the buffer target tier.

4. The storage system according to claim 2, wherein
the storage management unit determines the size of the buffer area based on an access cost based on an access frequency of each tier of the storage pool and a change in the access cost when the size of the buffer area is changed.

5. The storage system according to claim 2, wherein
the storage management unit dynamically changes the size of the buffer area during an operation of the storage pool.

6. The storage system according to claim 2, wherein
the storage management unit is configured to determine pages to be stored in each tier based on access frequencies of the page of the storage pool, and determine a size of each of the plurality of tiers based on a total size of the pages determined to be stored.

7. The storage system according to claim 4, wherein
the storage management unit determines pages to be stored in each tier such that the pages with higher access frequencies are stored in the upper tier.

8. The storage system according to claim 1, wherein
the storages include an object storage connected via a network, and
the storage management unit allocates the buffer area to the storage device and allocates the buffer target tier to the object storage.

9. The storage system according to claim 8, wherein
a storage service provided from an outside is used as the object storage.

10. The storage system according to claim 1, wherein
the storage management unit is configured to:
   determine the tier for storing the data based on an access frequency of the data,
   store the data accessed in the buffer target tier in the buffer area and buffer target tier, respectively, and
   release a page whose data is not accessed in the buffer area for a certain period of time or longer.

11. The storage system according to claim 10, wherein
the storage management unit extracts a plurality of pages that are not accessed in the buffer area for the certain period of time or longer, and releases a predetermined number of pages based on access frequencies to the data of the extracted pages.

12. A method for managing a storage system, comprising:
tiering a storing area of a storage pool into a plurality of tiers, and allocating the tiers to storages having different access performances;
determining, from the plurality of tiers, a tier for storing data based on an access frequency of the data;
providing, in the storage pool, a buffer area for temporarily storing data stored in a buffer target tier, which is at least one of the plurality of tiers, and allocating the buffer area to a storage having a higher access performance than a storage to which the buffer target tier is allocated; and
determining a size of the buffer area based on an access frequency of the buffer target tier.

* * * * *